Feb. 3, 1925.

B. M. SHIPLEY 1,524,755

CASH REGISTER

Filed Dec. 16, 1921   10 Sheets-Sheet 1

Inventor
Bernis M. Shipley
BY
His Attorneys

Feb. 3, 1925.
B. M. SHIPLEY
CASH REGISTER
Filed Dec. 16, 1921
1,524,755
10 Sheets-Sheet 2
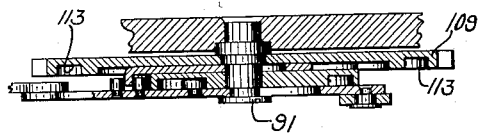
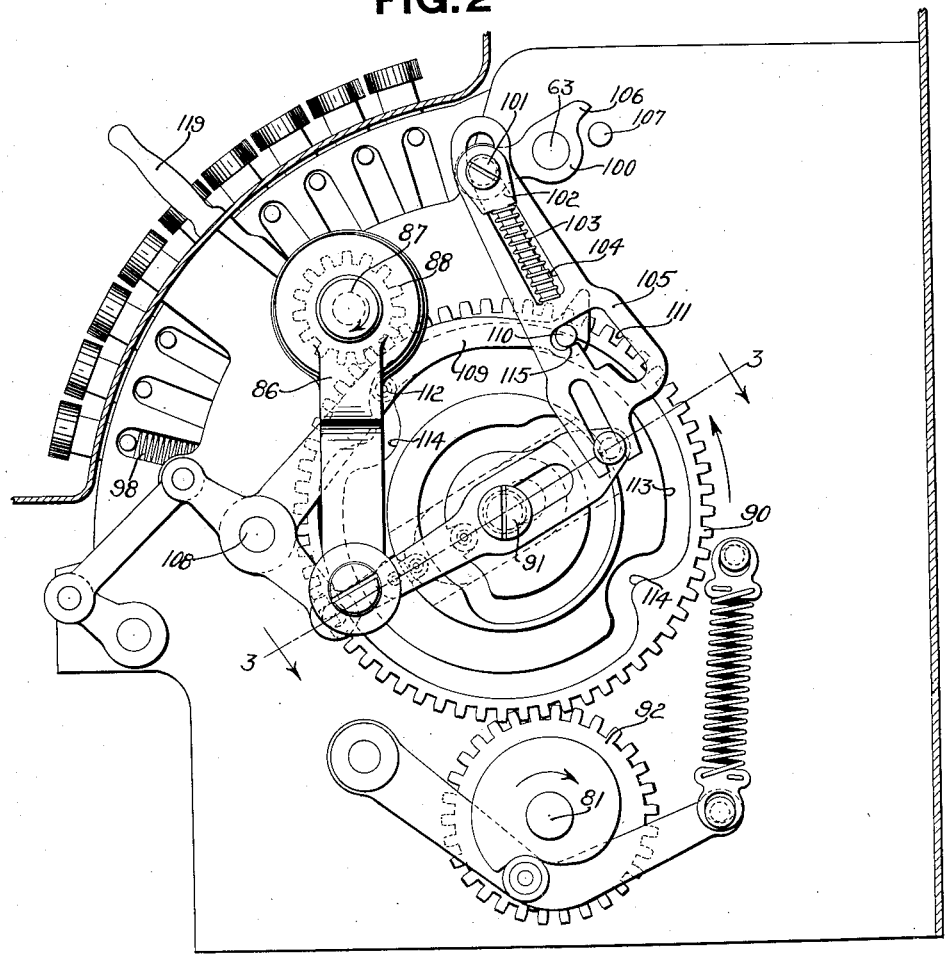
Inventor
Bernis M. Shipley
BY Carl Beust
and Henry E. Stauffer
His Attorneys Feb. 3, 1925.
B. M. SHIPLEY
1,524,755
CASH REGISTER
Filed Dec. 16, 1921    10 Sheets-Sheet 3
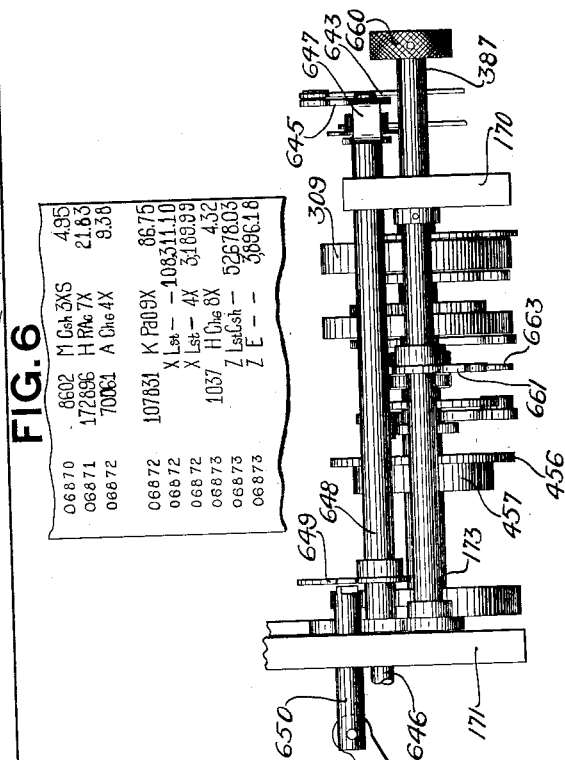
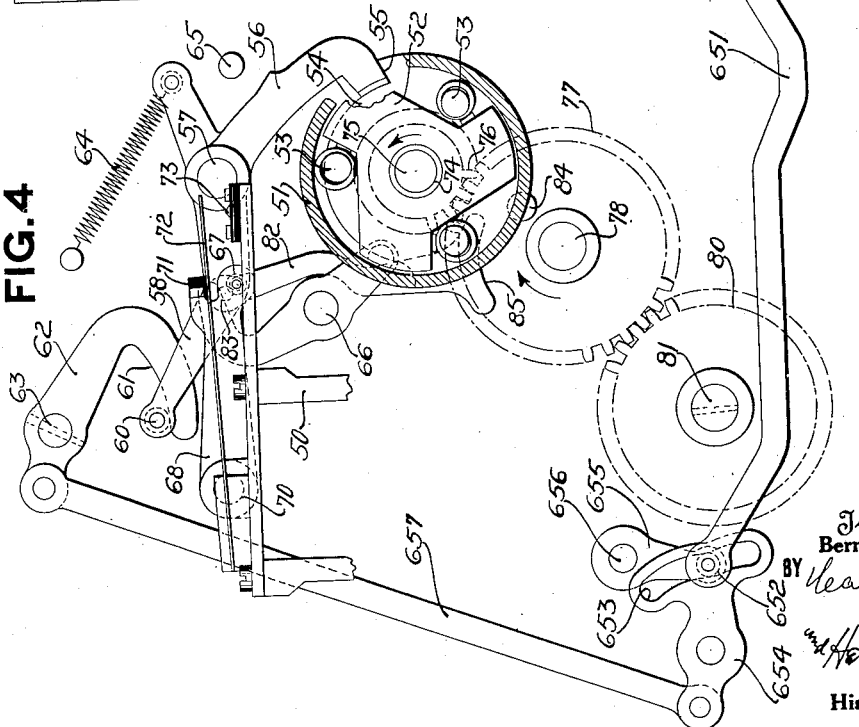

Feb. 3, 1925.
B. M. SHIPLEY
CASH REGISTER
Filed Dec. 16, 1921
1,524,755
10 Sheets-Sheet 4
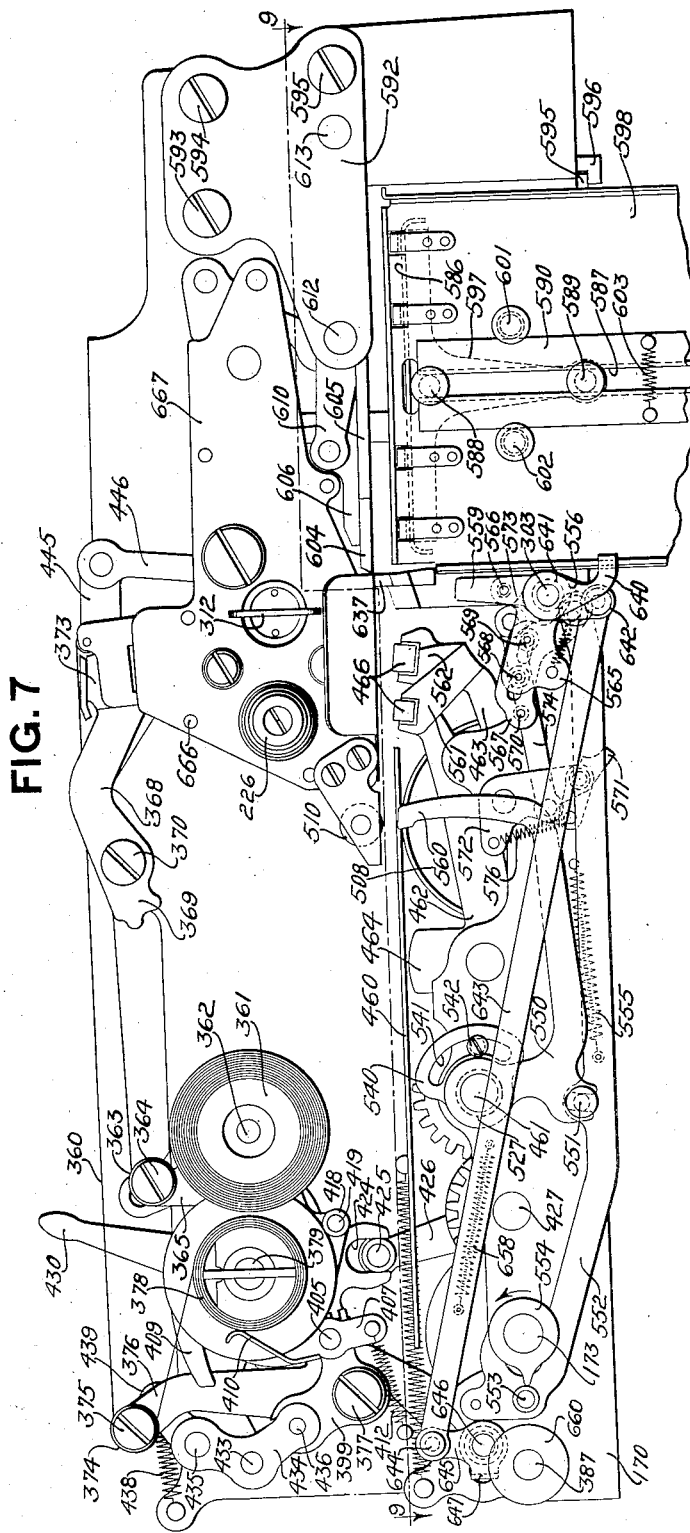
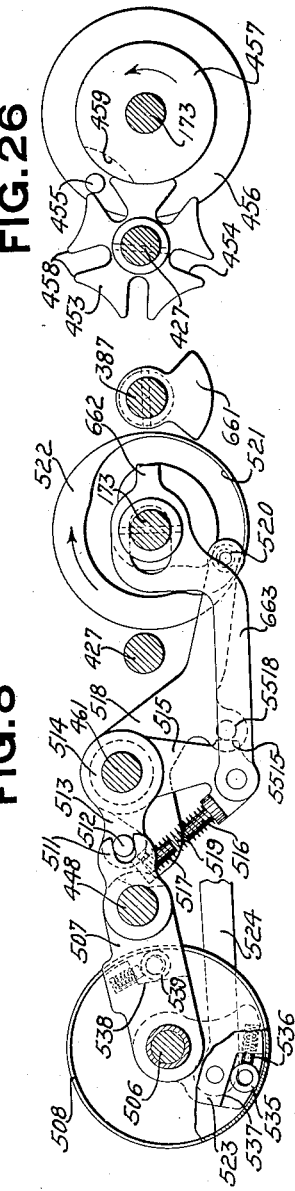
FIG. 7
FIG. 8
FIG. 26
Inventor
Bernis M. Shipley
BY Pearl Beust
and Henry E. Stauffer.
His Attorneys Feb. 3, 1925.

B. M. SHIPLEY

CASH REGISTER

Filed Dec. 16, 1921

Inventor
Bernis M. Shipley
BY
His Attorneys

Feb. 3, 1925.

B. M. SHIPLEY

CASH REGISTER

Filed Dec. 16, 1921

Inventor
Bernis M. Shipley
BY Carl Beust
by Henry E. Stauffer
His Attorneys

Feb. 3, 1925.

B. M. SHIPLEY

CASH REGISTER

Filed Dec. 16, 1921

Inventor
Bernis M. Shipley
BY Earl Beust
and Henry E. Stauffer
His Attorneys

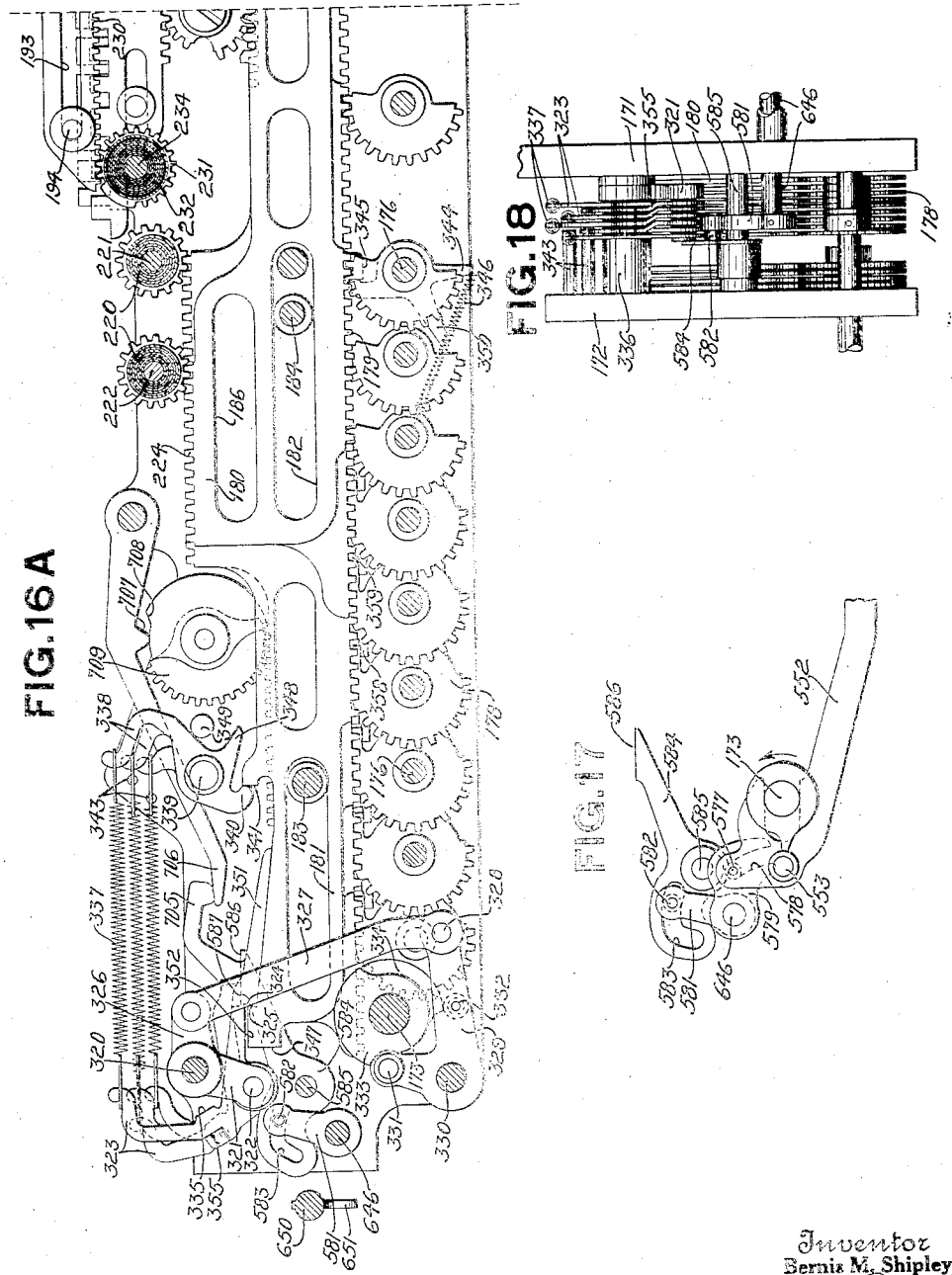

Feb. 3, 1925.
B. M. SHIPLEY
1,524,755
CASH REGISTER
Filed Dec. 16, 1921 10 Sheets-Sheet 9
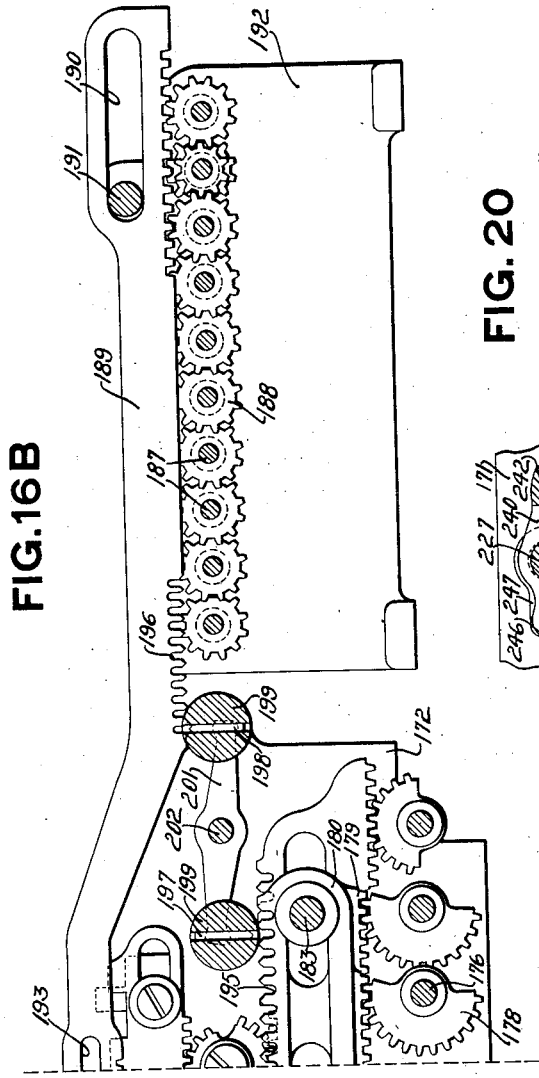
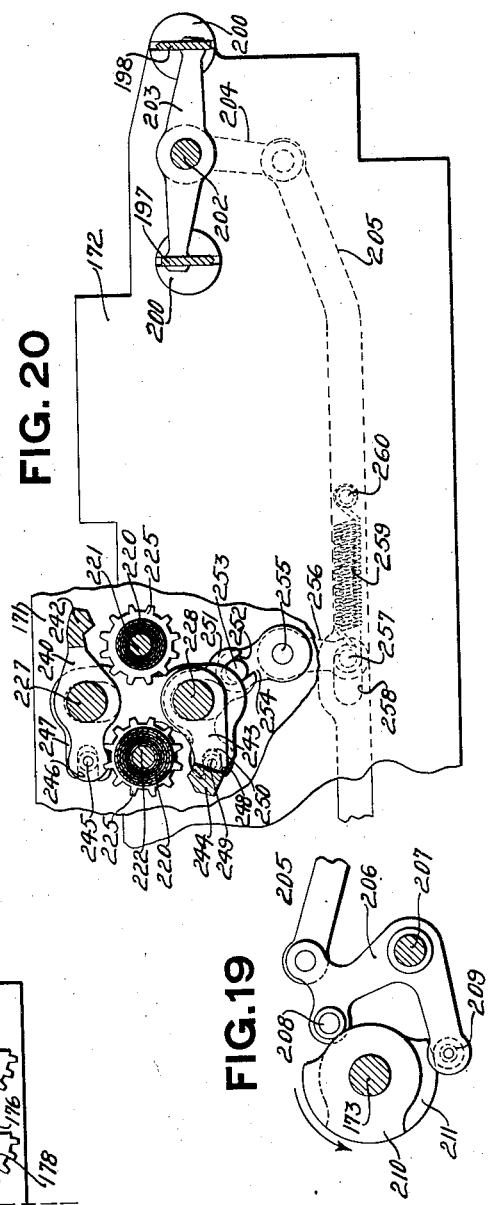
Inventor
Bernis M. Shipley
BY Hearl Benst
Henry E. Stauffer
His Attorneys Feb. 3, 1925.  1,524,755
B. M. SHIPLEY
CASH REGISTER
Filed Dec. 16, 1921  10 Sheets-Sheet 10

Inventor
Bernis M. Shipley
BY Carl Benst
Henry E. Stauffer
His Attorneys

Patented Feb. 3, 1925.

1,524,755

UNITED STATES PATENT OFFICE.

BERNIS M. SHIPLEY, OF DAYTON, OHIO, ASSIGNOR TO THE NATIONAL CASH REGISTER COMPANY, OF DAYTON, OHIO.

CASH REGISTER.

Application filed December 16, 1921. Serial No. 522,906.

*To all whom it may concern:*

Be it known that I, BERNIS M. SHIPLEY, a citizen of the United States, residing at Dayton, in the county of Montgomery and State of Ohio, have invented certain new and useful Improvements in Cash Registers, of which I declare the following to be a full, clear, and exact description.

This invention relates to cash registers and like machines and more particularly to machines of the type shown and described in Letters Patent of the United States No. 1,230,864, issued to W. A. Chryst on June 26, 1917, and Letters Patent of the United States Nos. 1,242,170 and 1,394,256, issued to F. L. Fuller on Oct. 9, 1917, and Oct. 18, 1921, respectively, and application for Letters Patent of the United States No. 451,508 filed by B. M. Shipley.

The principal object of this invention is to provide a machine which is readily adaptable for use in the offices of public service corporations such as electric light, gas, water and telephone companies or the like.

Another object of the invention is to provide a machine of the type specified which in addition to its usual functions will handle the monthly statements or bills issued by the company to its customers and which will print the necessary data on the said statement in duplicate, sever a portion thereof and retain said portion in the machine as a voucher.

Another object of the present invention is the provision of means for preventing operation of the machine unless the voucher receptacle is completely in or entirely out of the machine.

Still another object is to make it impossible to withdraw the voucher receptacle during the operation of the machine.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said figures:

Fig. 2 is a right side elevation of the machine with the cabinet and base removed.

Fig. 3 is a detail sectional view taken on the line 3—3 of Fig. 2.

Fig. 4 is a left hand side elevation of the machine showing part of the motor drive and part of the printing mechanism.

Fig. 5 is a sample of one form of bill with voucher attached which this machine is adapted to handle.

Fig. 6 is a portion of the detail strip printed by this machine.

Fig. 7 is a front elevation of the printing mechanism.

Fig. 8 is a view of the slip feed tension mechanism.

Figures 9, 10:
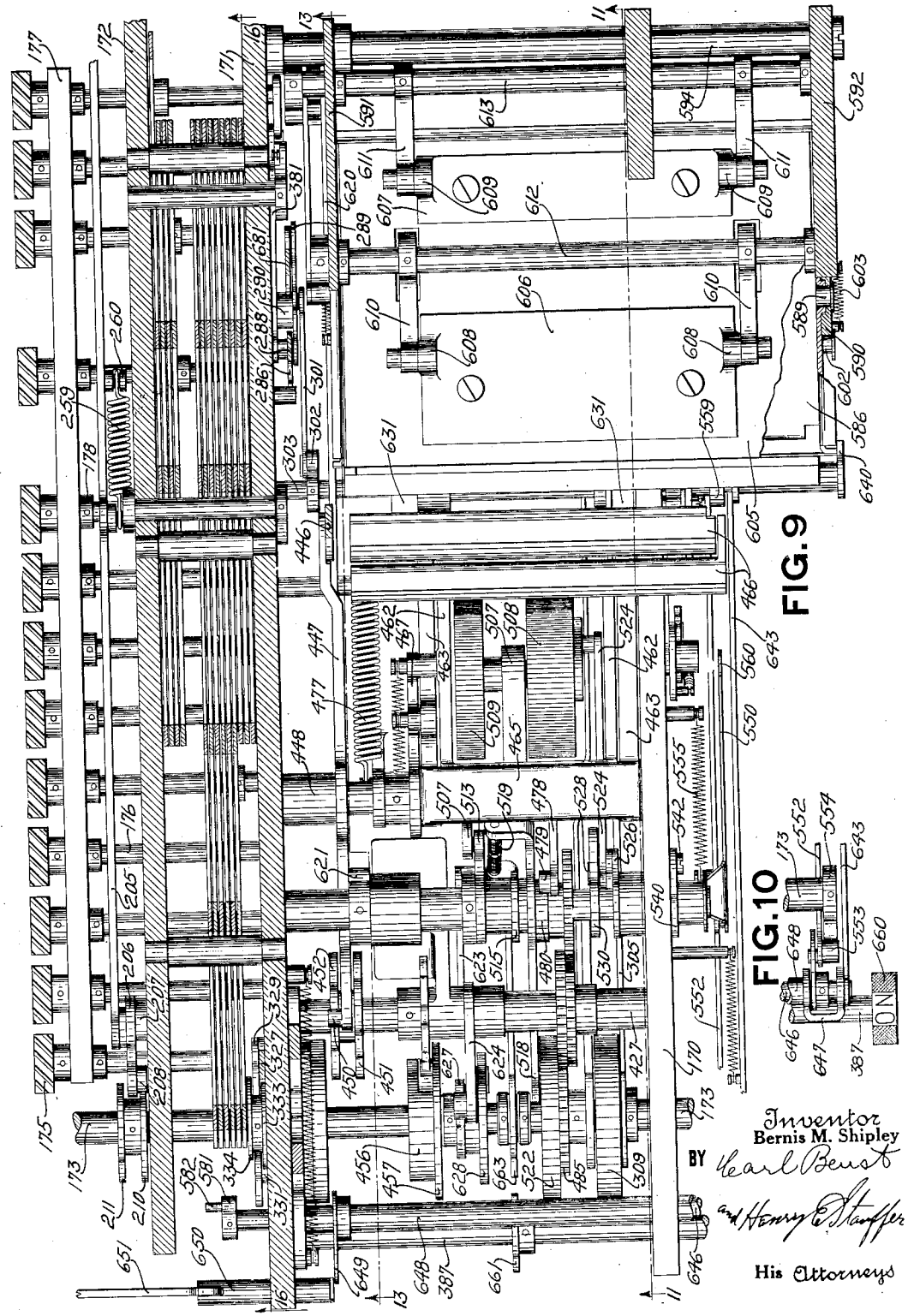
Fig. 9 is a horizontal sectional view on the line 9—9 of Fig. 7.
Fig. 10 is a fragmentary view of the printer control knob and some of the cooperating mechanism.

Figs. 16$^A$ and 16$^B$ taken together illustrate a sectional view taken on line 16—16 of Fig. 9.

Fig. 17 is a detail view partly broken away showing the mechanism for the so-called "S" printing device.

Fig. 18 is a left hand elevation partly broken away, illustrating some of the type wheel racks and a portion of the zero elimination device.

Fig. 19 is a detail view of the type wheel rack aliner operating mechanism.

Fig. 20 is a view partly broken away, illustrating the type wheel alining mechanism and the type wheel rack aliners.

Figure 21:
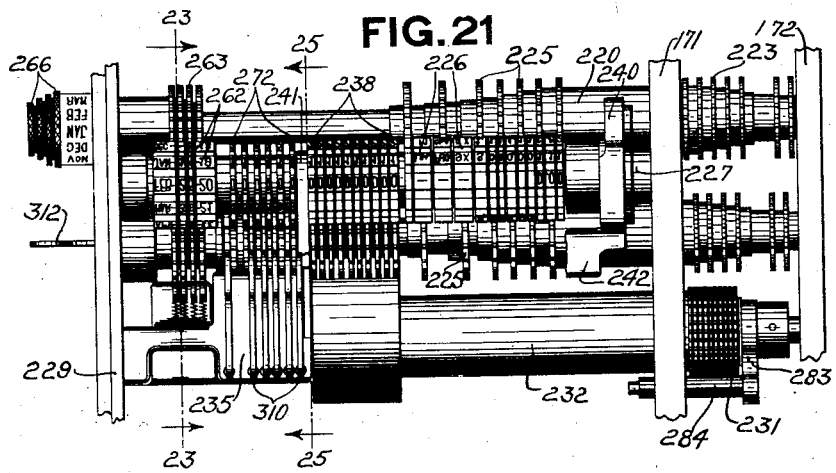

Fig. 21 is a top plan view of the type wheel line and associated tube lines for operating the same.

Figure 22:
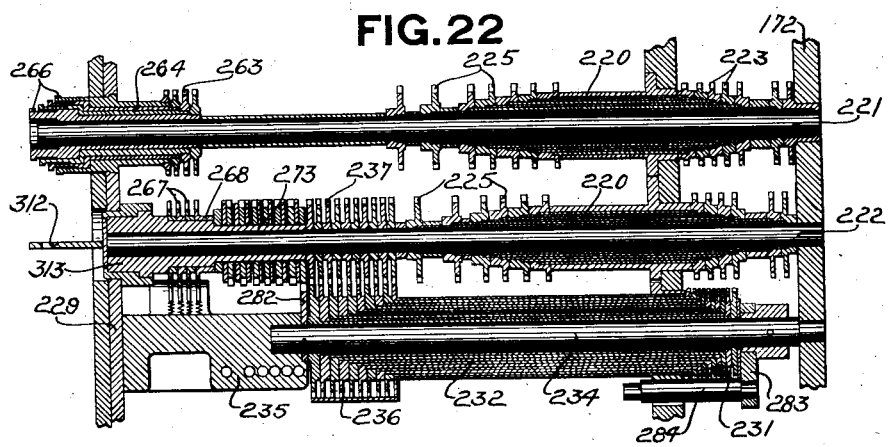

Fig. 22 is a horizontal sectional view through the centers of the three tube lines.

Figure 23:
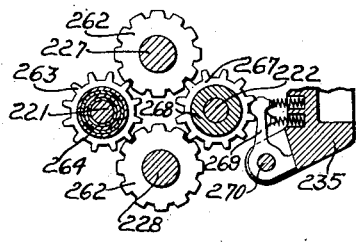

Fig. 23 is a section on line 23—23 of Fig. 21, looking in the direction of the arrows.

Figure 24:
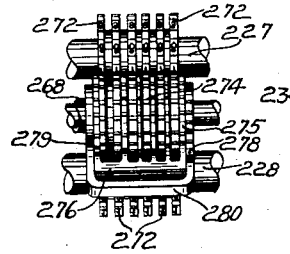

Fig. 24 is a view partly broken away showing the consecutive number printing mechanism.

Figure 25:
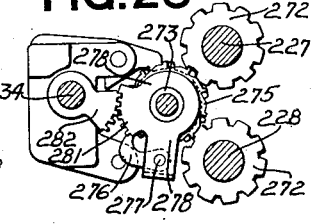

Fig. 25 is a section on line 25—25 of Fig. 21.

Fig. 26 is a detail view of the Geneva mechanism for driving the detail strip impression mechanism.

In general.

Described in general terms, the machine in its preferred form comprises a plurality of totalizers, one for each department, each clerk, each regular and special transaction, and one for totalizing any unrelated group of items. These totalizers are operated by differential mechanism under the control of the manipulative means which in this case are the amount keys.

The differential mechanism provides means whereby the printing mechanism is set to print the amounts which are entered in the totalizers and also to print totals from said totalizers.

The printing mechanism comprises a plurality of type-lines carrying amount type-wheels, date type-wheels, consecutive number type-wheels and ledger number type-wheels. The amount and ledger number type-wheels are set differentially by means of three separate tube lines interposed between the differential racks and the type-wheels. The date type-wheels are set by manually operated knobs in the usual manner. The consecutive number type-wheels are operated by a differential tined pawl. To operate the ledger number type-wheels there is provided a plurality of banks of depressible keys similar to the amount keys.

This machine in its present embodiment is especially adaptable for use in the offices of public service corporations which issue monthly statements to their customers in a duplicate form. When the statement is presented for payment the machine will print the word "Paid" or other data on the part of the statement returned to the customer and print the date, amount, clerk's initial, kind of transaction, etc., on both portions of the statement. The statement is then severed between the duplicate impressions and one portion thereof returned to the customer as a receipt and the remainder automatically deposited in a locked compartment to be used as a voucher of the transaction.

Aside from printing on the inserted statement the printing mechanism will print the same data with the exception of the date on a detail strip.

When a slip or statement is inserted an "S" will be printed both on the statement and the detail strip. However, when no statement is printed the "S" is omitted from the detail strip. When a sub-total is taken an "X" is printed on both statement and detail strip and when a total is taken a "Z" is printed.

Operating mechanism.

The motor which it is desired to use in connection with the present machine is of the well known type illustrated and described in Letters Patent of the United States No. 1,144,418 granted to Charles F. Kettering and William A. Chryst on June 29, 1915. For a detailed description of the same reference may be had to that patent. Only a part of the motor frame and the switch for the motor and a part of the clutch mechanism for the motor are shown in the accompanying drawings.

Figure 1:
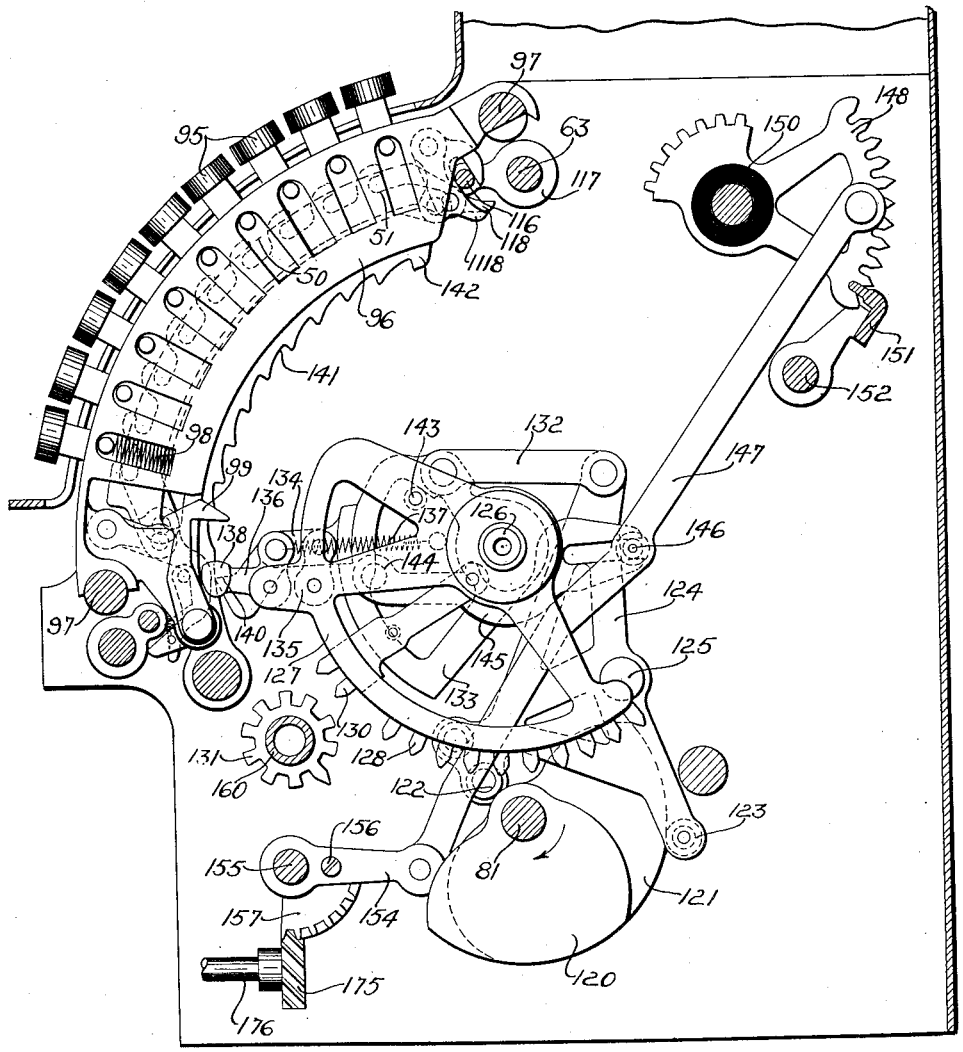
Fig. 1 is a sectional view taken alongside one of the banks of amount keys.

The motor is carried by a frame 50 (Fig. 4) mounted on the left side frame of the machine. A clutch member 51 forming one part of the clutch device and shown in section is rotated through means (not shown) operated by the motor. A plate 52 forming another member of the clutch cooperates with rollers 53 carried by a plate 54 and is connected thereby to the clutch member 51 upon the release of the machine, as fully shown and described in the aforesaid Kettering and Chryst patent. The plate 54 has a shoulder 55 engaged by the end of a lever 56 mounted on a stud 57 on the frame of the machine. An arm 58 of the lever 56 carries a roller 60 which normally rests on the curved edge 61 of a lever 62 fast on a shaft 63 which extends across the entire machine and has bearings in the frames thereof (Figs. 1 and 2). When the lever 62 is rocked counter-clockwise to release the machine, as will be hereinafter described, the lever 56 is rocked counter-clockwise out of engagement with the shoulder 55 by a spring 64. Counter-clockwise movement of the lever 56 is limited by a stud 65 on the frame of the machine. Upon release of the lever 56 the plate 54 and other parts of the clutch (not shown) are moved by spring action, as fully described in the above mentioned Kettering and Chryst patent. This movement of the clutch moves the rollers into operative position, and rocks a lever 66 pivotally mounted on the frame of the machine in a clockwise direction. The upper end of the lever 66 engages a roller 67 carried by a lever 68 pivoted at 70 to the motor frame and rocks said lever clockwise, whereupon an insulated portion 71 of said lever moves a contact spring 72 into engagement with a contact point 73, thereby closing the circuit through the motor. The clutch member 52 is fast on a sleeve 74 mounted on a stud 75 on the frame of the machine. A gear 76 is fast on the sleeve 74 and meshes with a gear 77 on a stud 78 on the frame of the machine. The gear 77 meshes with a gear 80 fast on a cam shaft 81 mounted in the frames of the machine. Through this gearing the cam shaft is rotated once at each operation of the machine.

For the purpose of restoring the lever 56 to locking position near the end of the operation of the machine a link 82 is pivoted at 83 to said lever. The gear 77 carries a pin 84 which, near the end of the operation of the machine, engages a curved portion 85 of the link 82 and raises the link, thereby moving the lever 56 to its normal position.

As will be described later, the lever 62 is rocked clockwise to normal position just before the pin 84 passes out of engagement with the link 82 in order to retain the lever 56 in its normal position.

It may sometimes be necessary to operate the machine by hand instead of using the motor. For this reason there is provided a handle 86 (Fig. 2) fast on a stud 87 which extends into a short tube fast in the right hand frame of the machine. Rigid with the handle 86 is a gear 88 (Fig. 2), meshing with a gear 90 mounted on a stud 91 projecting from the frame of the machine. The gear 90 meshes with a gear 92 fast on the shaft 81. The ratio of the gears 88, 90 and 92 is such that two rotations of the gear 88 will cause one rotation of the gear 92 and consequently the shaft 81.

Keyboard.

The keyboard mechanism of the present machine is identically like that shown and described in the beforementioned Shipley application No. 451,508, and reference is hereby made thereto for a full and clear description of the same. Only a brief description of the keyboard and its cooperating mechanism will be given herein.

The keyboard comprises eight banks of amount keys; one bank of department keys; one bank of transaction keys; and one bank of eight keys representing clerks and one key called herein the "list" key, which latter may be used for the purpose of releasing the operating mechanism when it is desired to add a list of numbers.

There are also ten ledger number banks of keys and a total lever which is for the purpose of controlling the machine for total and sub-total printing operations.

The keys 95 of each amount bank are mounted in an individual frame 96 (Fig. 1) mounted on cross rods 97 carried by the machine frame. The keys are retained in their normal outward position by compression springs 98 bearing upon pins projecting from the shanks thereof.

When a key is depressed it cooperates with a detent 50 and a locking plate 51 and is thereby retained in its depressed position, as is well known in the art. Each bank is provided with a zero stop pawl 99 (Fig. 1), pivoted to the frame of the bank and adapted to be rocked to ineffective position upon the depression of any key in the bank and held in this position until the parts are again returned to normal.

The present machine is normally released for operation by the depression of the list key or one of the department keys, which releases the shaft 63. The means for rocking the shaft 63 counter-clockwise (Figs. 1 and 2) to release the motor clutch mechanism, previously described, comprises a lever 100 (Fig. 2) fast on said shaft. The lever 100 carries a screw stud 101 upon which are pivoted two members 102, the lower ends of which are surrounded by a coil spring 103 compressed between shoulders on said members 102 and the end wall of a slot 104 in a link 105 also surrounding the stud 101. From this it can be seen that as soon as the department keys or the "list" key is depressed the spring 103 will rock the lever 100 and consequently the shaft 63 clockwise (Figs. 1 and 2). This movement is limited by a projection 106 on the lever 100 contacting with a stud 107 on the frame.

Near the end of the operation of the machine all of the depressed amount, department, transaction and clerks' keys are released so that they may be restored to their normal positions by their springs.

Pivoted on a stud 108 on the frame is a lever 109 (Fig. 2) carrying a pin 110 projecting into an opening 111 in the above described link 105. The lever 109 carries an anti-friction roller 112 projecting into a cam groove 113 in the gear 90. It will be remembered that this gear receives one-half a revolution at each adding operation of the machine. Therefore, there are two cam portions 114 in the groove 113. The stud 110 normally lies in a portion 115 of the slot 111. Near the end of the half rotation of the gear 90 one of the cam portions 114, through the roller 112 rocks the lever 109 clockwise and the stud 110 moves the link 105 downward in the direction of its length whereby the upper end wall of the slot 104 engages the stud 101 and rocks the lever 100 and the shaft 63 first counter-clockwise past normal position and then clockwise to normal position (Fig. 2). A rod 116 is carried by arms 117 fast on shaft 63. Said rod is lowered past normal position and engages a projection 118 on the arm which supports the upper end of the detent, and forces the detent downward. The locking plate is also moved to normal position by the movement of the rod 116 which engages its supporting link 1118 so that the springs 98 are permitted to restore the depressed keys to undepressed position.

Means is provided for preventing the operator from holding the keys in depressed position to cause an immediate second operation of the machine, but as this feature forms no part of the present invention it will not be described herein.

The total lever 119 is for the purpose of controlling the machine in total and sub-total printing operations.

Differential mechanism.

To drive the differential mechanism of the machine the drive shaft 81 is provided with a plurality of pairs of cams 120 and 121 (Fig. 1) each pair cooperating with rollers 122 and 123, respectively, carried by Y-shaped levers 124 pivoted at 125 to the differential frame (not shown). Loose on studs 126 carried by the differential frames are differentially movable members 127 carrying racks 128 and transfer arms 130 for operating totalizer pinions 131. The upper ends of the levers 124 are connected by links 132 to driving segments 133 loose on the studs 126. The segments 133 adjacent the banks of amount keys are connected to the differentially movable members 127 by latches 134 each of which is supported by an arm 135 and a lever 136 pivoted on the corresponding differential member. Springs 137 hold the rear ends of the latches 134 in engagement with the shoulders on the driving segments 133. When the segments 133 associated with the amount banks are driven by their cams 120 and 121 the members 127 are rotated clockwise with their latches until portions 138 of the levers 136 engage the depressed keys. Such engagement results in the disengagement of the latches from the driving segments and the engagement of the ends 140 of the latches 134 with the particular notches 141 formed in plates 142 opposite the latches at the time. Upon return movement of the segments 133 to normal position said segments engage studs 143 carried by the members 127 and return said members to normal positions. If a key has not been depressed in an amount bank the zero stop pawl 99 for that bank operates the latch to arrest the member 127 in the zero position. However, when a key is depressed the zero stop pawl is rocked to ineffective position as previously described.

Pivoted to each of the members 127 at a point 144 is a beam 145 bifurcated at its rear end to surround a stud 146 mounted near the center of a link 147. The links 147 are pivoted at their upper ends to segment 148 mounted on nested sleeves 150. These segments are used for alining purposes and are engaged by aliners 151 fast on a shaft 152 (Fig. 1). The beams are operated in the usual manner fully described in the before mentioned Fuller patent to differentially position the link 147 and consequently the segments 148. The means for rocking the aliners into and out of engagement with the segment 148 is not shown or described herein as said means is fully illustrated and described in a patent to Fuller No. 1,163,748, dated Dec. 14, 1915. Pivoted to the lower end of each link 147 is an arm 154 loose on a shaft 155. Loose on the shaft 155 and connected by a pin 156 to the arm 154 is a spiral segment 157. The differential positioning of the link 147 differentially positions the arm 154 and the segment 157 for the purpose of setting up the printing elements to be later described.

Totalizers.

Only a general description of the totalizers of the present machine will be given herein. They form no part of the present invention and are shown and described in all of the beforementioned patents and application.

A machine of this type usually is provided with three totalizer lines or tubes carrying totalizer elements 131. For the sake of clearness only one line and its appropriate differential mechanism are shown herein, and their cooperating mechanism are duplicates of the one shown.

The totalizer elements are loosely mounted on a tube 160 which is slidably supported in the machine frames. The tube is slid longitudinally of the machine under control of certain keys in adding and totaling operations to bring any desired set of totalizer elements into alinement with the differential actuators. The totalizer line is then rocked into engagement with the actuators and the amount entered in the appropriate set of totalizer elements, and during total or sub-total operations the actuators are moved in accordance with the amount in the totalizer.

Suitable mechanism for transferring from lower to higher order totalizer elements is provided, but as this mechanism is old and is clearly described and illustrated in the previously mentioned patents no description thereof will be included herein.

Printer.

The printing mechanism is located in front of the machine proper. The framework for this mechanism comprises a front frame 170, an intermediate frame 171 and a rear frame 172 (best shown in Fig. 9), all of which are mounted upon the base of the machine.

The entire printing mechanism is driven by the operation of the cash register. A shaft 173, which is rotatably mounted in the frames 170, 171 and 172, is connected by suitable gearing to the main drive shaft 81 of the cash register. The clockwise rotation of the shaft 81 rotates the shaft 173 counter-clockwise.

Meshing with each of the spiral segments 157 (Fig. 1) actuated by the movement of the differential mechanisms, as previously described, is a spiral gear 175 secured to a shaft 176 mounted in the intermediate frame 171 and a bracket 177 carried by the rear frame 172. The shafts 176 are held against lateral movement by the hub of the gear 175 on one side of the bracket 177 and by a collar 178 secured to the shaft on the other side of the bracket.

There is one spiral gear 175 associated with each of the amount banks, the department bank, transaction bank and the clerk's bank.

Secured to each shaft 176 is a segment 178 (Figs. 16^A, 16^B and 18). Meshing with the segments 178 are teeth 179 of racks 180. Each of these racks has slots 181 and 182 surrounding rods 183 and 184 respectively. The racks are spaced laterally by plates (not shown) carried by the rod 184. Each rack has a clearance slot 186. The racks are spaced at each end by collars (not shown) carried by the rods 183.

From the above description it can be readily seen that the differential movements of the differential units through the spiral segments 157 and spiral gears 175 are transferred to the racks 180.

*Printer—Ledger device rack mechanism.*

Appropriate to each bank of ledger number keys are spiral segments and gears for transferring the differential movement to a series of shafts 187, one for each bank of ledger number keys. Each of these shafts 187 carries fast on its forward end a gear 188, the teeth of which are adapted to mesh with the teeth of its appropriate rack 189. Each rack 189 has a slot 190 through which extends a rod 191 supported by the frame 192, and another frame (not shown). Each rack 189 also has another slot 193 (Figs. 16^A and 16^B) through which extends a rod 194 supported at one end by the frame 171 and at its other end by a plate (not shown) mounted on the frame 172.

From the above description it can be seen that all the ledger racks 189 are differentially set by the differential mechanism under the control of the ledger number keys.

*Printer—Rack aliners.*

The racks 180 have alining notches 195 (Fig. 16^B) and the racks 189 have alining notches 196. Cooperating with these notches are two aliners 197 and 198 respectively, slidably supported at one end by bosses 199 (Fig. 16^B) on the frame 171 and at the other end by bosses 200 on the frame 172. Adjacent the bosses 199 is a lever 201 (Fig. 16^B) fast on a shaft 202 mounted in the frames 171 and 172. Adjacent the bosses 200 is a lever 203 (Fig. 20) also fast on the shaft 202. The levers 201 and 203 engage slots (not shown) in the aliners 197 and 198. Also fast on shaft 202 is an arm 204 to which is pivoted a link 205 also pivoted to a lever 206 (Fig. 19) loose on a stud 207 on the frame 172. The lever 206 carries anti-friction rollers 208 and 209 cooperating with cams 210 and 211 fast on the printer drive shaft 173.

The aliners 197 and 198 are normally out of engagement with the notches 195 and 196. After the racks 180 and 189 have been differentially positioned under the control of the amount, department, transaction, clerks' and ledger keys, the cams 210 and 211 rock the lever 206 clockwise, whereby the link 205 rocks the arm 204, shaft 202 and levers 201 and 203 counter-clockwise, whereby the aliner 197 is rocked into engagement with the notches 195 on the racks 180 and the aliner 198 is rocked into engagement with the notches 196 on the racks 189 thereby maintaining said racks in proper alinement during the printing operations to be hereinafter described. After the printing has taken place cams 210 and 211 rock the lever 206 counterclockwise to normal position, thereby disengaging the aliners 197 and 198 from the racks 180 and 189.

*Printer—Tube lines.*

Associated with the racks 180 are two tube lines which are for the purpose of setting the amount, department, transaction and clerks' type-wheels to be hereinafter described. These tube lines comprise nested tubes 220 (Figs. 13, 16^A, 21 and 22) supported by shafts 221 and 222.

Tubes 220 have secured at their right hand ends (Figs. 21 and 22) gears 223 which mesh with teeth 224 on the upper edge of the racks 180. The racks 180 alternate in meshing with these gears 220. Secured to the left end of the tubes 220 are gears 225. These gears 225 mesh with two sets of type-wheels 226, one set loose on a long stud 227 and the other set loose on a long stud 228 mounted in the frames 172. At their outer ends these studs 227 and 228 support a plate 229 (Figs 21 and 22). Type-wheels 226 are for printing amounts, department, transaction and clerks' initials in a manner to be later described.

From the description just given it is clear that the differential movement of the racks 180 under the control of the various banks of keys is imparted to the type wheels 226 through the medium of the gears 223, tubes 220 and gears 225, thereby differentially setting said type wheels. Meshing with teeth 230 of racks 189 are gears 231 (Fig. 16^A) secured to the end of nested tubes 232 supported on a shaft 234 mounted in the frame 172 and a block 235 supported by the plate 229. Secured to the other end of the tubes 232 are gears 236 meshing with gears 237 loose on the shaft 222. The gears 237 mesh with two sets of type-wheels 238.

From the above description it can be seen that the differential movement of the racks 189 under the control of the ledger keys is through the gears 231, tube lines 232, gears 236 and 237, imparted to the ledger number type-wheels 238 whereby the ledger number may be printed therefrom by means to be hereinafter described.

*Printer—Type-wheel aliners.*

As has been previously described, there is an alining mechanism for the racks 180 and 189. This alining mechanism in a way serves to aline the type-wheels, but as there is a chance for the type-wheels, due to lost motion through gears, etc., to get out of alinement, another alining device is provided which cooperates with the gears 225 that mesh direct with the type-wheels 226 and 238.

Loose on the stud 227 are parallel arms 240 and 241 (Figs. 20 and 21) connected by an alining bar 242 adapted to cooperate with the gears 225 on the shaft 221. Loose on the stud 228 are parallel arms 243 (only one of which is shown in Fig. 20) connected by an alining bar 244 adapted to cooperate with the gears 225 on the shaft 222. The arm 240 has a stud 245 projecting into a slot 246 of a plate 247 slidably mounted on the studs 227 and 228. The plate 247 also has another slot 248 receiving a stud 249 on one of the arms 243. A slot 250 of a bell crank 251 also receives the stud 249. The bell crank 251 is loose on the stud 228 and has another slot 252 receiving a pin 253 on an arm 254 fast on a shaft 255 mounted in the frames 171 and 172. Also fast on the shaft 255 is an arm 256 carrying a stud 257 projecting through a slot 258 in the link 205. A spring 259 stretched between the stud 257 and a stud 260 on the link 205 cushions the alining bars 242 and 244 as they are moved into alining position.

It will be remembered in connection with the rack alining mechanism that the link 205 is moved first to the right and then to the left to normal position. When this occurs the spring 259 rocks the arm 256, shaft 255 and arm 254 counter-clockwise. This movement through the pin 252 and bell crank 251 rocks the arms 243 clockwise thereby raising the alining bar 244 into engagement with the gears 225 on the shaft 222. Clockwise movement of the arms 243 through the engagement of the stud 249 with the plate 247 raises said plate and through its engagement with the stud 245 rocks the arms 240 and 241 clockwise, thereby lowering the alining bar 242 into engagement with the teeth of the gears 225 on the shaft 221.

It is to be understood that the alining of the gears 225 takes place at the same time that the racks 180 and 189 are alined by the aliners 197 and 198, as previously described. When the link 205 is moved to the left to normal position to disengage the aliners from the racks 180 and 189 the end wall of the slot 258 rocks the arm 256 clockwise to normal position and through the bell crank 254 and plate 247 rocks the arms 240, 241, and 243 counter-clockwise to normal position, thereby raising the alining bar 242 and lowering the alining bar 244 to their normal positions.

*Printer—Date type-wheels.*

Loose on the studs 227 and 228 are four date type-wheels 262 (Figs. 21 and 23). Meshing with these type-wheels are gears 263 secured to the ends of nested sleeves 264 on the shaft 221. The sleeves 264 are connected by mortise and tenon (not shown). The knurled hubs 266 which project outside of the cabinet of the machine are for the purpose of manually setting the date type-wheels 262. The construction of the hubs 266 and the sleeves 264 is very similar to that shown in the above mentioned Fuller Patent No. 1,394,256. In order to set the date the operator pulls the hubs 266 outward so that they may be grasped more conveniently and turns them to the desired position, which, through the sleeves 264 and gears 263, sets the date type-wheels 262.

To insure that the date type-wheels are in proper position for printing, there are four gears 267 (Figs. 22 and 23) loose on the intermediate portion of a sleeve 268 surrounding the shaft 222. These gears are in mesh with the date type-wheels 262 and are engaged by spring-pressed pawls 269 mounted on a stud 270 carried in the block 235.

As the date wheels 262 are being set, the gears 267 rotate and the pawls 269 rock in and out of mesh with said gears. When the operator has rotated the hubs 266 to the desired position the type-wheels 262 will be approximately in alinement and the pawls 269 force them into absolute alinement as soon as the operator releases his grip on the hubs 266. In other words, these pawls 269 take up all the lost motion between the hubs 266 and the type-wheels 262, thereby insuring a true printing line from said date type-wheels.

*Printer—Consecutive number type-wheels.*

Figure 13:
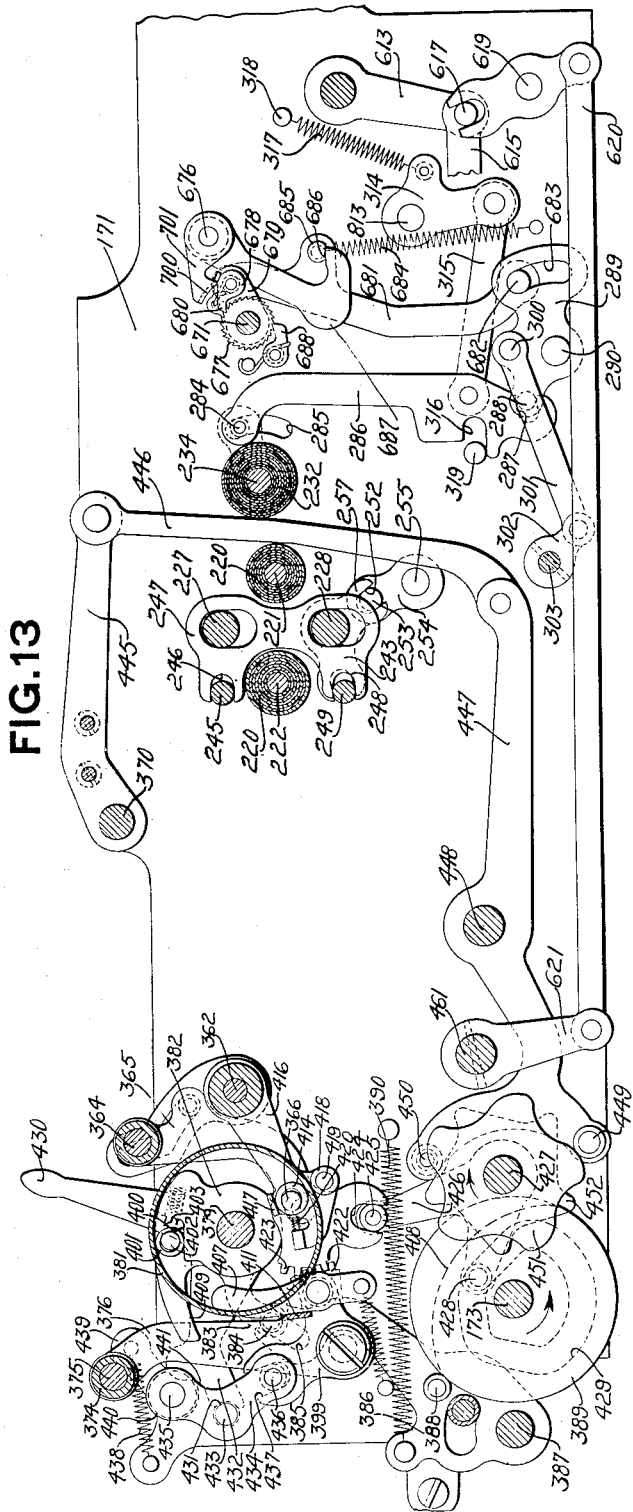
Fig. 13 is a section on line 13—13 of Fig. 9, looking in the direction of the arrows.

Loose on the studs 227 and 228 between the ledger number type-wheels 238 and the date type-wheels 262 are six consecutive number typewheels 272 (Figs. 21, 24 and 25). Loose on the portion 273 of the sleeve 268 are gears 274 meshing with both sets of type-wheels 272. Secured to the side of each gear 274 is a ratchet 275. Co-operating with the ratchets 275 is a differentially tined pawl 276 mounted on a rod 277 carried by parallel arms 278 and 279 loose on the hub 273. The arms 278 and 279 are made integral by a yoke 280. The arm 278 has teeth 281 meshing with a segment 282 fast on the shaft 234. Also fast on the shaft 234 is an arm 283 carrying a stud 284 (Figs. 21 and 22) extending through a slot 285 in the frame 171 (Fig. 13). Pivoted on the stud 284 is a link 286 which has a slot 287 receiving a pin 288 on a lever 289 fast on a shaft 290 mounted in the frames 171 and 172.

Pivoted to the lever 289 at 300 is a link 301 (Fig. 9), which at its opposite end is connected to an arm 302 fast on a shaft 303 rotatably mounted in the frames 170 and 171. Also fast on the shaft 303 (Fig. 11) is an arm 304 to which the right hand end of a pitman 305 is pivotally connected. This pitman at its left hand end is U-shaped and surrounds a collar 306 on the shaft 173. The pitman 305 carries an anti-friction roller 307 extending into a cam race 308 of a disk 309 fast on the shaft 173. This shaft, as previously described, makes one counter-clockwise rotation during each adding operation of the machine. The configuration of the race 308 is such that the pitman 305 is moved first to the left (Fig. 11) and through the arm 304, shaft 303, arm 302 and link 301 rocks the lever 289 counter-clockwise (Fig. 13). This lowers the link 286 and rocks the arm 283 and shaft 234 counter-clockwise, as viewed in Fig. 25. This movement of the shaft 234 through the engagement of the segment 282 with the teeth 281 rocks arms 278 and 279 upward, thereby moving the pawl 276 upward, which turns the units ratchet one step in a clockwise direction. The gear 274 being fast to said ratchet receives the same movement, thereby advancing the consecutive number type-wheels one step. At this point in the race there is a slight drop which moves the pitman 305 slightly to the right, and through the mechanism just mentioned moves the tines of the pawl 276 downward away from the feeding edge of the ratchet 275. This is done because in feeding movements of this kind the pawls are always given a slight overthrow movement to insure the "taking-up" of all clearances between the main driver and the driven member. Near the end of the rotation of the shaft 173 the race 308 moves the pitman 305 still further to the right to its normal position, thereby lowering the pawl 276 to the position shown in Fig. 25.

To prevent retrograde movement of the ratchets 275 and gears 274 when the pawl 276 is being restored to its normal position, there is in engagement with the ratchets a set of spring-pressed pawls 310 pivoted on a rod 311 (Fig. 11) supported by the block 235. These pawls also serve to aline the consecutive type-wheels 272 so that they will print in a straight line.

The means for transferring from the units to the tens and from the tens to the hundreds, etc., involves the "deep notch" principle, which is very old and well known in the art and illustrated in Letters Patent of the United States No. 589,114 issued to F. H. Bickford on Aug. 31, 1897.

To turn the consecutive number type-wheels 272 to zero a key 312 is inserted in the portion 313 of the sleeve 268 and given one complete turn. This method of turning the consecutive numbers to zero is well known in the art and it is not thought necessary to go into detailed illustration or description thereof. It is thought that it will be sufficient to say that the sleeve portion 273 has a groove for cooperation with engaging pawls (not shown) carried by each of the gears 274 adjacent the periphery of said sleeve portion so that as the same is turned by the key 312 the groove therein picks up the pawls during its rotation and rotates the gears 274 and consequently the type-wheels to zero position.

During paid-out transactions and when the machine is used for listing, or when a total is to be printed, it is not desirable that "1" be added to the consecutive number counter. Mechanism is provided to disconnect the counter from its driving mechanism in such cases.

Adjacent the banks of clerks' and transaction keys are special detents which are adapted to be actuated only by the paid-out and list keys. This detent mechanism is not shown in the present application as it forms no part of the present invention. It is, however, fully shown in the copending application of the present applicant, No. 451,-508. When, however, either of these detents is operated by its respective key a shaft 813 (Fig. 13) is rotated in a clockwise direction. Fast on this shaft is an arm 314 to which is pivoted a link 315. This link at its opposite end is pivotally connected to the link 286 which drives the consecutive number counter. A spring 317 fastened between a projection on the arm 314 and a stud 318 projecting from frame 171 maintains the arm 314, link 315 and link 286 in their normal positions, in which position the slot 287 in the link 286 is in cooperative relation with the pin 288 on the lever 289. When, however, the shaft 813 is rocked by the depression of either of the above mentioned keys the link 286 is swung clockwise about the point 284 by means of arm 314 and link 315 until a stud 319 projecting from the frame 171 becomes engaged in a slot 316 cut in the link 286. It can be seen from the above that when either of the paid-out or list keys is depressed the link 286 will not receive the movement usually imparted to it by the lever 289, as it is disconnected therefrom, and therefore nothing will be added to the consecutive number counter. When, near the end of the operation, the keys are returned to their normal positions, the spring 317 will return link 286 to its normal position by means of link 315 and arm 314.

*Printer—Zero elimination.*

After the racks 180 have been positioned by the actuation of the differential actuators, as determined by the keys depressed in the various banks, and before an impression is taken from the type-wheels associated with these racks, a mechanism is operated for the purpose of preventing the printing of ciphers to the left of the highest denomination represented by a digit other than a cipher in any printed number, or to the left of the units of dollars rack, and for the printing of ciphers to the right. This mechanism, known in the art as "zero elimination" mechanism, will now be described.

Loose on a rod 320 (Fig. 16^A) carried by the frames 171 and 172 is an arm 321 carrying a pin 322 on which are loosely mounted six levers 323, each having a shoulder 324 adapted to engage a notch 325 in each of the six highest amount racks. The highest denomination rack 323 is not shown in the eliminated position in Fig. 16^A, for reasons to be hereinafter described, but the five next lower denominations are shown in the eliminated position.

Pivoted to an arm 326 integral with the arm 321 is a link 327 pivoted at 328 to a bell crank 329 pivoted on a rod 330 carried by the frames 171 and 172. Said bell crank carries anti-friction rollers 331 and 332 cooperating with cams 333 and 334 respectively, fast on the shaft 173.

As above stated, the five racks next to the highest amount rack are shown in the "eliminated" position. Upon rotation of the shaft 173 the bell crank 329 is rocked counterclockwise and raises the link 327 which rocks the arms 326 and 321 counter-clockwise. This movement carries the levers 323 toward the racks (Fig. 16^A) until a portion 335 of said levers strikes a collar 336 on the rod 320. When this occurs the levers 323 rock counter-clockwise and disengage the shoulders 324 thereof from the notches 325 in the rack 180. The movement of the levers 323 counter-clockwise stretches springs 337 connecting the upper ends of the levers 323 and levers 338 loose on a rod 339 supported by the frames 171 and 172 whereby said levers are rocked counter-clockwise. Each lever 338 has a projection 340 engaging a shoulder 341 on the racks 180. Counter-clockwise movement of the levers 338 by the springs 337 moves the $10, $100, $1,000 and $10,000 racks 180 through the engagement of the projections 341 and shoulders 340 toward the right to zero position (Fig. 16^A). The right hand ends of the springs 337 for the two highest amount racks are secured to studs 343 (Figs. 16^A and 18) on the frame 172. Loose on the shaft 176 associated with the units of cents rack 180 are two levers 344 held in engagement with projections 345 on the two highest amount racks by springs 346. When the levers 323 for these two racks are released from the notches 325 these springs 346 rock the levers 344 clockwise and move the two highest amount racks to the right to zero position. However, the springs 337 and 346 are not depended upon because as the arm 321 is rocked counter-clockwise the levers 323 themselves engage an edge 347 on the racks 180 and positively move them to the right to zero position.

After the racks have been moved to zero position, springs 337 and 346 hold them until they are moved further under the control of the differential mechanism. As the racks are moved further to the right counter-clockwise movement of the levers 338 is limited by a projection 348 on said levers contacting with a stud 349 on the frame 172. Clockwise movement of the levers 334 is limited by a projection 350 thereof contacting with the shaft 176 associated with the tens of cents rack 180.

After the levers 323 have been released from the racks 180 and said racks have been restored to zero position they are differentially positioned under the control of depressed keys by the segments 178, as previously described. When said racks are so moved to the right a portion 351 of the levers 323 rides on the surface 352 of the racks 180 thereby holding the levers in raised position.

The four right hand levers 323 (Fig. 18) each have a portion 355 bent over so that it lies in the plane of its adjacent lever to the left. There is no portion 355 bent over in the plane of the lever 323 associated with the highest amount rack, because as has been previously mentioned, this mechanism is not used in adding operations and does not have to be eliminated except under certain conditions which will be hereinafter described in connection with the slip printing mechanism.

From this construction it can be seen that when the amount registered is large enough to cause the eighth rack 323, commencing with the unit rack at the right (Fig. 18), to be positioned, the lever 323 cooperating with said eighth rack is raised and held in the raised position by the engagement of the edge 352 with the portion 351 of said lever. As the portion 355 of the lever 323 associated with the seventh rack is in the plane of the lever 323 associated with the eighth rack, said lever 323 of the seventh rack is likewise held in the raised position so that its hook 324 can not engage the notch 325 of the seventh rack. The lever 323 of the seventh rack, through its engagement with the portion 355 of the lever connected to the sixth rack, holds said lever in the raised position, and so on toward the right. From this it can be seen that should the amount be $300,000.00 for instance, all the zeros would be printed because the portion 355 of the lever 323 cooperating with the eighth rack, or in other words the rack which sets up the numeral 3, engages the lever to the right (Fig. 18) and it in turn engages the lever to its right, and so on, thereby holding those levers 323 so that the shoulders 324 thereof can not engage the notches 325 in these racks 180. However, the ninth or highest amount rack 180 not being involved in the amount will remain in the zero position, whereupon and during the rotation of the shaft 173 the cams 333 and 334 rock the bell crank 329 clockwise and lower the link 327, which rocks the arms 326 and 321 clockwise. This movement of the arm 321 allows the lever 323 associated with the ninth rack to be rocked clockwise, whereby its shoulder 324 engages the notch 325 in the ninth rack and moves said rack to the left one space, whereby the type-wheel associated with this rack is moved from zero position to a non-print position so that the character in the zero position in this rack will not be printed.

Means is provided for crippling the zero eliminating means when the highest amount rack is differentially moved to the right, as in cases of sub-total and total printing. The lever 323 associated with the next to the highest rack is provided with an arm 705 overlying an arm 706 pivoted on the frame 172. Cooperating with a projection 707 on the arm 706 is a cam 708 rigid with a gear 709 cooperating with a toothed portion on the highest amount rack. Movement of the highest amount rack to set up a digit therefore operates to cripple the zero eliminating means for the next to the highest rack, which in turn cripples the zero eliminating means for the lower racks.

When the racks 180 are moved to the eliminated position by the levers 323, as just described, a hook portion 358 on the racks engages an extension 359 on the segments 178 and positively locks the segments and consequently the differential mechanism associated therewith in this position.

*Printer—Detail strip mechanism.*

A detail strip 360 (Figs. 7 and 11) is fed from a supply roll 361 mounted on a stud 362 on the frame 171, around a roller 363 on a stud 364 on a lever 365, pivoted on a stud 366 (Fig. 13) on the frame 171. From the roller 363 the strip is passed to the right over a rod 367 carried by parallel arms 368 made integral by a yoke 369 loose on a stud 370 mounted in the frame 171. From the rod 367 the strip is fed to the right under a platen 371 carried by a U-bar 372 mounted in a block 373 integral with the arms 368, up and over the top of said block and to the left over a roller 374 on a stud 375 on a lever 376 pivoted on a stud 377 on the frame 171. From the roller 374 the strip is wound on a receiving roll 378 (Figs. 7 and 11) loose on a stud 379 mounted in the frame 171.

Secured to the receiving roll 378 is a disk 380 having an integral flange 381 (Fig. 13). Loose on the stud 379 is a casting 382 having an integral arm 383 carrying a pin 384 projecting into a slot 385 of a lever 386 loose on a shaft 387 mounted in the frames 170 and 171. The lever 386 carries an anti-friction roller 388, held in engagement with the periphery of a cam disk 389, fast on the shaft 173, by a spring 390 stretched between the lever 386 and a stud on the frame 171. The casting 382 is cut away at 400 and in this cut-away portion is a roller 401 loosely mounted on and normally eccentrically positioned with respect to a pin carried by the casting 382. A spring-pressed plunger holds the roller in engagement with the cut-away portion 400 and the inner periphery of the flange 381. Pivoted on a stud 405 carried by a lever 399 (Figs. 11 and 13) loose on the stud 377 is a lever 407.

Upon counter-clockwise movement of the cam disk 389 (Fig. 13) the roller 388 on the lever 386 is caused to follow a cut-away portion 408 on the periphery of the disk 389 by the spring 390. This rocks the lever 386 clockwise and through its engagement with the stud 384 rocks the arm 383 and the casting 382 counter-clockwise until a portion 409 integral with the casting 382 strikes the upper end of the lever 407. During this counter-clockwise movement of the casting 382 the roller 401 is rolled along the inner periphery of the flange 381 and slightly compresses the spring plunger. During the latter part of the first half of the counter-clockwise movement of the disk 389 the roller 388 is moved toward the true periphery of said disk thereby rocking the lever 386 counter-clockwise to normal position. This rocks the arm 383 and casting 382 clockwise to normal position, whereby the roller 401 becomes slightly wedged between the cut-away portion 400 of said casting and the inner periphery of the flange 381, thereby rotating said flange and its integral disk 380 clockwise. The receiving roll 378 being fast to the disk 380 receives the same clockwise movement, thereby winding the detail strip 360 upon said receiving roll.

Engaging the detail strip after it is wound on roll 378 is a plate 410 (Figs. 7 and 11) secured to an ear 411 integral with the lever 407. A spring 412 holds the plate 410 in constant engagement with the detail strip as it is wound on the receiving roll. As the receiving roll becomes larger the plate 410 is moved to the left (Fig. 11), thereby rocking the lever 407 counter-clockwise about the stud 405. This positions the upper end of the lever 407 nearer to the outer end of the portion 409 and slightly closer to said portion so that the rocking movement of the casting 382 in a counter-clockwise direction is lessened in order that the printing on the detail strip may be evenly spaced apart.

For the purpose of preventing the flange 381 from being rocked counter-clockwise as the casting 382 is rocked counter-clockwise, a retaining roll 414 is loosely mounted on a stud carried on an arm 416 loose on the stud 362 for cooperation with said flange. A bent portion 417 on the arm 416 is held in the position shown in Fig. 13 by a roller 418 carried on a stud 419 on the arm 416 engaging the outer periphery of the flange 381. A spring plunger 420 engages the roll 414 and holds it in engagement with the portion 417 and the inner portion of the flange 381. When the casting 382 is rocked counter-clockwise it can not move the flange 381 because immediately upon such attempted movement the roller 414 becomes slightly wedged between the portion 417 and the inner periphery of the flange 381, which positively prevents any counter-clockwise movement of said flange. On the other hand, when the flange 381 is rocked clockwise to wind paper on the receiving roll the roller 414 immediately becomes loosened and slightly compresses the spring plunger 420 thereby allowing a free clockwise movement of the flange 381.

Figures 11, 12:
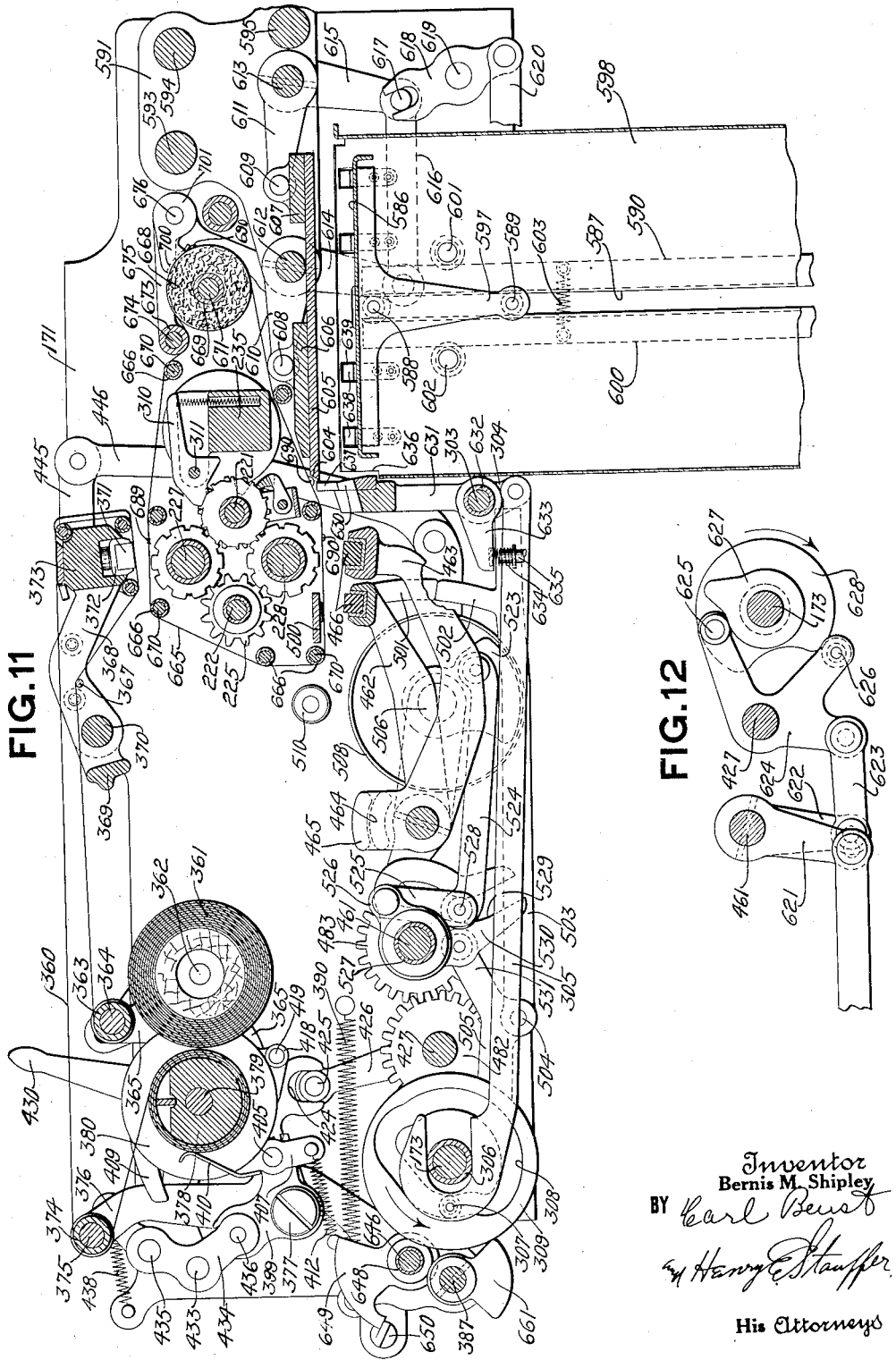
Fig. 11 is a section on line 11—11 of Fig. 9, looking in the direction of the arrows.
Fig. 12 is a detail view of the knife operating cam.

All of the printed impressions on the detail strip are visible through a glass which forms part of the printer cabinet. To allow the last printed item to be visible through said glass the detail strip is shifted after the printing takes place. In Figs. 11 and 13 the mechanism for shifting the detail strip is shown in its normal position, whereby the last printed item is visible through the glass.

Integral with the lever 376 (Fig. 13) is a segment 422 meshing with a segment 423 integral with the lever 365. The lever 365 has a slot 424 receiving a stud 425 on a bell crank 426 loose on a shaft 427 mounted in the frames 170 and 171. The bell crank 426 carries an anti-friction roller 428 projecting into a cam-race 429 in the disk 389.

Just before the detail feed takes place, as previously described, and before the detail impression occurs, to be hereinafter described, a counter-clockwise movement of the disk 389 rocks the bell crank 426 clockwise and through its engagement with the lever 365 rocks said lever counter-clockwise. Counter-clockwise movement of the lever 365 through the engagement of its segment with the segment 422 rocks the lever 376 clockwise. The rocking movements of these two levers 376 and 365, due to their gear connections, is simultaneous. As the lever 376 rocks clockwise (Fig. 11) a slack occurs in the detail strip 360, which is immediately taken up by the counter-clockwise movement of the lever 365 and in this manner the top line of the detail strip 360 is moved to the right to position the last printed item directly underneath the platen 371. After the detail strip is shifted to this position the feeding mechanism previously described is operated to position the last printed item the proper distance toward the right from the platen 371. After the detail strip has been shifted and fed as just described an impression is made thereon from the type-wheels in a manner to be hereinafter described. After the impression and near the end of the operation the race 429 moves the bell crank 426 counter-clockwise toward normal position, thereby rocking the the lever 365 clockwise and the lever 376 counter-clockwise to their normal positions which separates the rolls 374 and 364 and causes the top line of the detail strip (Fig. 36) to be moved to the left so that the last printed impression lies just underneath the edge of the glass in the printer cabinet.

At certain times it may be desirable to make autographic notes on the detail strip under the last printed impression. For this purpose the cabinet is provided with a suitable hand-rest (not shown) with an opening between said rest and the glass through which the detail strip is visible. When this autographic feature is used it is necessary to feed the detail strip a greater distance so that the printing will not fall upon the autographic notations.

To change the feeding movement of the detail strip there is a lever 430 (Figs. 7, 11 and 13) loose on the stud 379. When the autographic feature is not used the lever 430 is in the position shown in Fig. 13, in which a notch 431 of an arm 432 integral with said lever is in engagement with a stud 433 on a lever 434. The lever 434 is mounted on a stud 435 on the frame 171. The lever 434 has a stud 436 lying within a slot in the previously described bell crank 399 which carries the lever 407. The stud 433 is held in the notch 431 by a spring 438 stretched between an arm 439 made rigid with the lever 434 by a hub 440, and a stud on the frame 171.

When the autographic feature is used the operator moves the lever 430 to the left (Fig. 13), thereby disengaging the notch 431 from the stud 433 and engaging a notch 441 of the arm 434 with said stud. The notch 441 is nearer the stud 379 than is the notch 431, and therefore when the lever 430 is moved as just described the spring 438 rocks the arm 434 counter-clockwise to hold the stud 433 in engagement with the notch 431. Counter-clockwise movement of the lever 434 through its engagement with the bell crank 399 rocks said bell crank clockwise, thereby moving the lever 407 downward. With the parts in this position, as just described, it is very clear that when the casting 382 is rocked counter-clockwise it is rocked a greater distance before a portion 409 thereof strikes the top of the lever 407. Therefore, when said casting is rocked clockwise to normal position it rotates the flange 381 and the receiving roll 378 clockwise a greater distance than when the lever 430 is in the position shown. This greater rotation of the receiving roll 378 causes the detail strip to be fed a greater distance than when the autographic feature is not used and thereby permits the impression to be made below the autographic notation instead of conflicting therewith.

Loose on the stud 370 and secured to the arm 368 (Figs. 9, 11 and 13) is an arm 445 to which is pivoted a link 446 which is also pivoted to a lever 447 loose on a rod 448 mounted in the frames 170 and 171. The lever 447 carries anti-friction rollers 449 and 450 cooperating with cams 451 and 452 respectively, fast on the shaft 427. Also fast on the shaft 427 is a Geneva plate 453 (Fig. 26). Cooperating with the notches 454 in said plate is a pin 455 on a disk 456 fast on the shaft 173. When the disk 456 is rotated with the shaft 173 in a counter-clockwise direction, the pin 455 engages with one of the notches 454 of the Geneva plate and rotates said plate and the shaft 427 clockwise until the pin disengages itself from said plate. As the two cams 451 and 452 are fast on the shaft 427 they too are rotated clockwise one-fifth of a revolution, there being five slots 454 in the Geneva plate 453. Movement of the cams 451 and 452 rocks the lever 447 first clockwise and then counter-clockwise to normal position. Clockwise movement of the lever 427 lowers the link 446 and rocks the arms 445 and 368 clockwise, which moves the platen 371 into contact with the upper set of type-wheels, thereby taking an impression therefrom on the detail strip. Counter-clockwise movement of the lever 447 to normal position raises the platen 371 from engagement with the type-wheels. The concave portions of the Geneva plate are normally in engagement with the periphery of the hub 457 of the disk 456. When the plate is rotated, as previously described, the points 458 project into a clearance cut 459 in the hub 457.

As it is not desired to have the date printed on the detail strip the strip does not extend over the date type-wheels 262 and therefore no impression is taken therefrom. Figure 6 illustrate a fragmentary portion of the detail strip which is printed in the manner above described. In the first line shown thereon "06870" is the consecutive number of the transaction, "8606" is the ledger number, "M" indicates which clerk operated the machine, "Csh" shows it was a cash transaction, "3X" is the department, "S" indicates that a slip was printed, and last appears the amount of "$4.95." The second line illustrates a "Recd. on acc't." transaction by clerk H of department 7X, the amount being $21.83. The third is a "Charge" transaction of $9.38 and the next is a "Paid out" transaction of $86.75. The next, or fifth line on the strip, indicates that a listing operation has taken place, that is, a number of items have been added and the total thereof printed.

*Printer—Slip printing mechanism.*

The machine is designed for printing upon an inserted slip or other paper substantially like the sample slip shown in Fig. 5. The slip is placed on a table 460 (Fig. 7) and the impressions are made thereon by the lower set of type-wheels.

Figure 14:
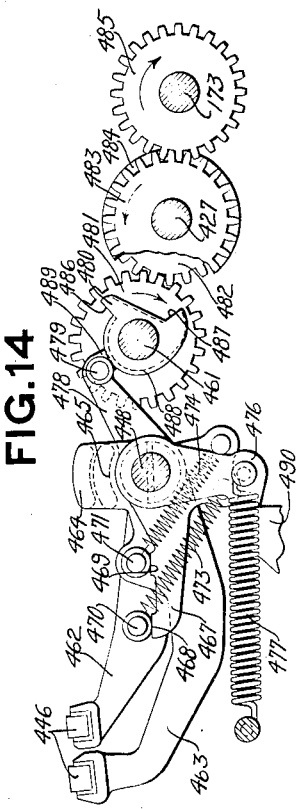
Fig. 14 is a detail of the slip printing hammers and the mechanism for driving them.

Loose on the shaft 448 are two pairs of arms 462 and 463 (Figs. 9, 11 and 13), each pair made integral respectively by means of yokes 464 and 465. Each of the pairs of arms 462 and 463 carries a U-bar in which is a platen 466 of rubber or other resilient material. Fast on the shaft 448 is a two-armed member 467, one arm of which carries portions 468 and 469 which abut against studs 470 and 471, each carried by one arm of the pairs of arms 462 and 463. Extending between these studs 470 and 471 and two studs carried by a downwardly projecting arm of the two-armed lever 467 are springs 473 and 474. Pinned to the shaft 448 is an arm 478 carrying at its end a roller 479 which cooperates with a cam 480 (Figs. 9 and 14), fast to a gear 481 rotatably mounted on shaft 461. The teeth of this gear mesh with the teeth of a gear 482 loose on a shaft 427 and fast to another gear 483 separated therefrom only by a thin disk 484 for alining purposes. Meshing with the gear 484 is another gear 485 fast to the shaft 173. As this shaft 173 is given one complete rotation at each operation of the machine the cam 480 will also receive a complete clockwise rotation (Fig. 14) due to the gearing just described. This cam has two high portions 486 and 487 and is cut away on the line 488 to receive the point 489 to place the roller 479 into cooperation with the high edge of the cam during actual camming action. The portions 486 and 487 rock the arm 478, shaft 448 and lever 467 counter-clockwise (Fig. 14). This movement of the lever 467 permits the arms 462 and 463 to rock counter-clockwise by gravity or under the influence of the springs 473 and 474, thereby lowering the platens 466.

Rigid with the lever 467 is an arm 476, having connected thereto a strong spring 477 also secured to a stud on the frame 171. This spring holds the lever 467 in engagement with a projection 490 secured to the base of the machine and thereby limits the clockwise movement of the lever 467 (Fig. 14). As above mentioned, the arm 478 is rocked counter-clockwise when the portions 486 and 487 engage the roller 479. One side of the portion 487 lies on a radius through the center of the shaft 461, thereby allowing very quick clockwise movement of the arm 478 under the influence of the spring 477. The point 489 of the arm 478 contacting with the portion 488 as the cam is about to leave the point 489 prevents the roller 479 from contacting with the cam. This gives a quicker drop or clockwise movement to the arm 478. As the arm 478 and lever 467 are fast on shaft on 448 and the arm 476 is rigid with the level 467 the spring 477 rocks these members very rapidly in a clockwise direction as the point 489 drops off the points 486 and 487. The engagement of the lever 467 with the studs 470 and 471 on arms 462 and 463 rocks these arms and the platens carried thereby clockwise very rapidly, thereby moving the platens 466 upward into contact with the lower set of type to make an impression on the inserted slip. To insure a good impression from the type the arm 476 strikes the stop 490 before the platens 466 engage the type, but as the arms 462 and 463 are loose on the shaft 448 the momentum given them by the spring 477 while the lever 467 is in contact with the studs 470 and 471 is sufficient to impel the platens against the type with a hammer blow.

It will be noticed upon an inspection of the sample slip shown in Fig. 5 that the word "Paid" is printed in addition to the date and other data printed by the lower type-wheels. The printing mechanism prints twice, first on the portion of the check to be retained as a voucher, and then the slip is fed forward toward the right (Fig. 11) and the same data is printed on the portion of the slip to be given the customer as a receipt. It is desirable that this portion have the word "Paid" printed thereon. This word is printed by means of a printing plate 500, supported by the printer frame and the platen 466 carried by the pair of arms 462. As it is not desired to have this word printed during the first impression a mechanism is provided for disabling the platen 466 carried by arms 462 during this portion of the operation. Adjacent to the front arm 462 the platen supporting member has a downwardly extending portion 501, the lower end of which rests on the upper end of a projection 502 of a member 503 pivoted at 504 to the slip feeding pitman 505. It can be seen from Figure 11 that during the taking of the first impression the platen-carrying arms 462 will not be lowered due to the depending portion 501 engaging the projection 502, and will not therefore receive the movement imparted to the other platen carrying arms by the spring 477. After the first impression has been taken, pitman 505 will be moved to the left (Fig. 11) and will by means of member 503, which is pivoted thereto, remove the projection 502 from beneath the portion 501. The second impression is then taken and as nothing is now in the way the platen is lowered and then driven upward against the printing plate 500 in order to print the word "Paid" on the customer's receipt portion of the slip. An opening is made in the table to allow the platens 466 to project therethrough.

The means for putting a tension on the slip so that it can not move while the impressions are being made thereon will now be described. Loosely mounted on a shaft 506, supported by the arm 507, loose on shaft 448, are two rollers 508 and 509 having their peripheries knurled for feeding purposes. They are adapted to be moved into engagement with a roller 510 in order to hold the slip during the impressions. To accomplish this, the arm 507 has a bifurcated extension 511 which surrounds a stud 512 carried by an arm 513 of a bell crank lever 514 loosely mounted on the shaft 461. The bell crank lever 514 has a downwardly extending arm 515 carrying a pin 516. Between this pin and a similar pin 517 carried by a lever 518, also loose on the shaft 461, is a coiled spring 519. The lever 518 at its opposite end has an anti-friction roller 520 which engages in a cam groove 521 in a disk 522 fast on the shaft 173. From the above it can be seen that when the cam disk 522 is given a complete rotation with the shaft 173 the lever 518 will be rocked in a clockwise direction (Fig. 8). This movement will compress the spring 519 and through this spring will rock the bell crank 514 counter-clockwise, which, by means of the slot 511 and pin 512, will rock the arm 507 and rollers 508 and 509 clockwise about shaft 448 into engagement with the roller 510, and thereby hold the slip against movement during the impression. After the first impression, mechanism to be described later feeds the slip and then a second impression is made.

Near the end of the operation the cam 522 rocks the lever 518 clockwise, and this movement, through a pin 5518 on the lever 518 and a shoulder 5515 on the arm 515, rocks the bell crank lever 514 clockwise, and through the slot 511 and pin 512, the arm 507 counter-clockwise to return the rollers to normal position assisted by the influence of gravity.

Figure 15:
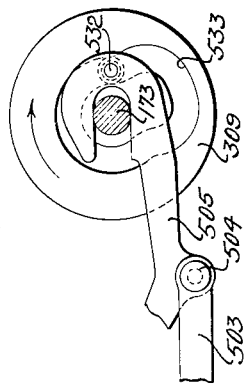
Fig. 15 is a detailed view of the cam for driving the slip feeding mechanism.

The means for feeding the slip between impressions comprises the following mechanism. Loose on the shaft 506 is a casting 523 to which a link 524 (Figs. 8 and 11) is connected, which at its opposite end is pivoted to the lower end of another link 525 whose upper end is connected to an arm 526 fast on a sleeve 527 surrounding the shaft 461. The pin 528 connecting the links 524 and 525 projects through a slot 529 in a lever 530 loose on the shaft 461. The lever 530 is pivoted to an arm 531 of the pitman 505 which has an anti-friction roller 532 cooperating with a cam race 533 in the disk 309 fast on shaft 173 (Fig. 15). Clockwise movement of the disk 309 moves the pitman 505 to the right (Fig. 11) and rocks the lever 530 counter-clockwise, thereby moving the link 524 to the right. This in turn rocks the casting 523 counter-clockwise (Fig. 11). The casting 523 carries a loosely mounted roller 535 engaged by a spring-pressed plunger 536. This roller is mounted between the inner periphery of the flange of the roller 508 and a cut-away portion 537 in the casting 523. Clockwise movement of the casting 523 does not rotate the roller 508 because of another loosely mounted roller 539 on the lever 507 becoming slightly wedged between a cut-away portion 538 of the lever 507 and the inner periphery of the roller 508. Movement of the casting 523, as just described, occurs just as the lever 507 is being rocked to engage the rollers 508 and 509 with the rollers 510. After said engagement, and after the first impression has been made upon the slip, the cam race 533 reverses the movement of the pitman 505, thereby through the mechanism above described rotating the casting 523 counter-clockwise, whereby the roller 535 becomes slightly wedged between the inner periphery of the roller 508 and the cut-away portion 537 of the casting 523, and the roller 508 is rotated to feed the slip so as to properly space the impressions thereon.

Should it be desired to change the distance between the impressions upon the slip in case a different style slip is used, there are means provided for adjusting the mechanism just described so that the rollers 508 and 509 can be rotated a greater distance than as just described. Secured to the sleeve 527 is a plate 540 (Fig. 7) having a slot 541. The plate is held in position by a screw 542 projecting through the slot 541 to hold the arm 526 immovable during operation of the machine. By loosening the screw 542 and moving the plate 540 clockwise (Fig. 7), the arm 526 is moved clockwise (Fig. 11) and moves the stud 528 downward in the slot 529, thereby moving said stud farther away from the center of the shaft 461. As the link 524 is moved back and forth through the medium of the slot 529 and stud 528 it is clear that the farther away from the center of the shaft 461 said stud is positioned when the machine is at rest the greater will be the movement of the link 524. Through this means the slip feeding mechanism may be caused to move varying distances to accommodate various slips.

When there is no slip in the machine the platens 466 are prevented from contacting with the type-wheels. Loose on the shaft 461 is an arm 550 engaging a stud 551 on a pitman 552 carrying a roller 553 cooperating with a cam 554 fast on shaft 173. The roller 553 is held in engagement with the cam 554 by a spring 555 stretched between a pin on the pitman and a pin on the frame 170. The pitman 552 is pivoted to a lever 556 loose on shaft 303. The lever 556 also has an upwardly extending projection 559 which is normally in the position shown in Fig. 7. Upon counter-clockwise rotation of the cam 554 the pitman 552 is moved to the right by the spring 555. If there is no slip in the machine a portion 560 of the lever 550 passes through an opening in the slip table 460 and the pitman rocks lever 556 counter-clockwise (Fig. 7) until the portion 559 is moved beneath two portions 561 and 562 made integral with the U-bars which carry platens 466. With the parts in the position as just described, the arm 467 is rocked counter-clockwise (Fig. 14) and stretches the springs 473 and 474. The portion 559 however is beneath the portions 561 and 562 and the springs 473 and 474 can not pull the platens down. When the end of the arm 478 drops off the high points of the cam 480 the arm 467 is rocked rapidly clockwise by a spring 477 but strikes and is stopped by the projection 490, and as the arms 462 and 463 have not been lowered the platens 466 will not be moved against the type-wheels. As the cam 554 nears the completion of its rotation the high portion thereon engages the roller 553 and moves the pitman 552 to the left (Fig. 7) to normal position, thereby rocking the portion 559 of member 558 out of engagement with the portions 561 and 562. When there is a slip in the machine the portion 560 of the lever 550 engages the under side of the slip and as a consequence said lever is rocked only slightly in a counter-clockwise direction when the high portion of the cam 554 leaves the roller 553, the spring 555 not being strong enough to cause the portion 560 of the lever 550 to break the slip. It is desirable, however, to return the above parts to normal position before the slip is fed, to prevent tearing the slip. To accomplish this purpose, the folowing mechanism is provided.

Loosely mounted on shaft 303 is a member 565 which is connected to the portion 559 of lever 556 by a pin 566. This member 565 carries a plate 567 slidably mounted thereon by means of slot and pin connections 568 and 569. At its end this plate carries a stud 570 which is adapted to cooperate with a flexible pawl 571 pivotally mounted on a lever 572 pivoted to the frame 170 of the machine. Fast on shaft 303 is an arm 573, to the other end of which is pivoted a link 574 which at its opposite end is pivotally connected to the lever 572. The shaft 303 is rocked first clockwise and then counter-clockwise (Fig. 7) by means of the cam 309, pitman 305 and arm 304. The clockwise movement of shaft 303 rocks the lever 572 counter-clockwise through the arm 573 and link 574. This movement of lever 572 brings pawl 571 into contact with stud 570 on plate 567 and by means of plate 567, member 565 and pin 566 rocks the lever 556 clockwise about shaft 303 to its normal position. It is held in this position by cam 309 and pitman 305 and thereby holds the portion 560 of lever 550 away from the slip. Near the end of the operation the shaft 303 is rocked counter-clockwise and through the mechanism above described returns the lever 572 to its normal position. Also near the end of the operation the high point of cam 554 comes into contact with roller 553 on pitman 552 and returns this pitman and its associated parts to normal position.

If there is no slip in the machine and the portion 560 projects through the plate 460 far enough to allow the spring 555 to rock the lever 556 to position its portion 559 underneath the portions 561 and 562 the plate 567 is moved with the lever 556 and positions the pin 570 so that during the counter-clockwise movement of the lever 572 the pawl 571 passes over the pin 570. During this operation when there is no slip in the machine the pawl 571 is moved to its normal position before the pitman 552 and lever 556 are restored to their normal positions. Therefore when said lever 556 is rocked clockwise the pin 570 strikes the pawl 571 and rocks said pawl counter-clockwise until the pin is passed, after which a spring 576 extending between a pin on the pawl and an extension of the lever 572 restores the pawl to the position shown in Fig. 7, in which the spring pin on the pawl limits the clockwise movement of the pawl by its engagement with a portion of the lever 572.

When a slip is in the machine, there is provided means for printing a letter "S" on the detail strip and the slip. This "S" is in the zero position of the highest amount wheel 225. When there is no slip in the machine this letter S is not printed on the detail strip. As previously described there is a zero elimination mechanism in the machine whereby the zeros to the left of the highest amount are eliminated. As above mentioned, the letter S occupies the zero position on the highest amount wheel. Therefore, when the S is printed it is necessary to cripple the zero elimination mechanism for the highest amount rack when a slip is in the machine.

The pitman 552 carries a pin 577 (Fig. 17), extending into a slot 578 of an arm 579 fast on shaft 646. Fast on the other end of the shaft 646 is an arm 581 carrying a pin 582 projecting into a slot 583 of a lever 584 loose on a shaft 585. An edge 586 of the lever 584 normally rests against a foot 587 (Fig. 16ᴬ) on the lever 323 associated with the rack 180 of highest denomination and holds said rack in the position shown, whereby its shoulder 324 is out of engagement with the notch 325 of said rack.

When a slip is in the machine the pitman 552 is moved only slightly to the right (Fig. 17), as above described. This movement, through the engagement of the pin 577 with the slot 578, rocks the arm 579, shaft 580 and arm 581 counter-clockwise. However, this movement does not move the pin 582 out of the substantially horizontal portion of the slot. Therefore, the lever 584 is held in the position shown, whereby its edge 586 remains in engagement with the foot 587 and does not permit the spring 337 to rock this lever 323 clockwise. From the above description it can be clearly seen that with the lever 323 held in the position shown in Fig. 16ᴬ by the lever 584 the shoulder 324 of said lever 323 can not engage the notch 325 of the highest amount rack 180 to move said rack from its zero position to the eliminated position when the other levers 323 eliminate their respective racks. Therefore, the highest amount type-wheels remain in the zero position to print the letter S on the slip and detail strip.

When there is no slip in the machine the pitman 552 moves a greater distance to the right (Fig. 17), thereby rocking the arms 579 and 581 counter-clockwise a greater distance. This moves the pin 582 through the substantially vertical portion of the slot 583, thereby rocking the lever 584 clockwise, whereby the shoulder 324 of the lever 323 engages the notch 325 of the rack 180, and as the levers are moved to the left (Fig 16ᴬ), as previously described, this rack 180 of highest denomination is moved from the zero or "S" position to move the type-wheels to a non-print position.

*Printer—Voucher severing mechanism.*

As previously stated, a portion of the slip (that to the right of the dotted line in Fig. 5), is severed from the inserted slip and retained in the machine as a voucher to the transaction. The mechanism for severing this portion of the slip and filing it away will now be described.

When the slip is fed, after the first impression has been made thereon it moves toward the right (Figs. 7 and 11) onto a table 586 slidably mounted in a vertical slot 587 in the front and rear walls, respectively, of a voucher receptacle 598 which is held in position in the machine by means of studs 595 projecting from the sides of the receptacle and adapted to slide in the right angled members 596, only one of which is shown herein. The table 586 has two downwardly extending projections 597, one on the front and the other on the back thereof, each carrying two rollers 588 and 589 which extend through the slots 587 and are engaged by two bars 590 and 600 which are held between flanged rollers supported on studs 601 and 602 projecting from the voucher receptacle. These bars 590 and 600 are drawn toward each other and against the rollers 588 and 589 by springs 603 with sufficient tension to hold the table 586 yieldingly at any point in the voucher receptacle 598.

At the very end of the operation the voucher portion of the slip is severed. This is accomplished by means of a knife 604 forming the left hand edge of a plate 605 which is supported by two plates 606 and 607 (Figs. 7 and 11) provided with ears 608 and 609 connected to pairs of arms 610 and 611 respectively. These arms are fast on two shafts 612 and 613 mounted in plates 591 and 592, which are in turn supported by rods 593, 594 and 595 mounted in the frame 171, which rods carry depending arms 614 and 615 connected at their lower ends by a link 616. The connecting stud 617 of the arm 615 projects through a slot in one end of a lever 618 pivoted at 619 to the frame 171. At its opposite end the lever 618 is pivoted to a link 620, which at its other end is pivotally connected to an arm 621 fast on shaft 461 (Figs. 12 and 13). Also fast on shaft 461 is an arm 622 pivotally connected to a link 623, which in turn is pivoted to a member 624 loose on shafts 427. The member 624 carries two rolls 625 and 626 cooperating with the peripheries of two cam disks 627 and 628 respectively, fast on shaft 173. These cams are rotated once at each operation of the machine, but they do not have any effect on member 624 until near the end of the operation when this member is rocked first clockwise and then counterclockwise to normal position (Fig. 12). This movement through the link 623, arm 622, shaft 461, arm 621 and link 620 rocks the lever 618 clockwise (Fig. 11), and thereby, through link 616 and arms 614 and 615 rocks the shafts 612 and 613 counter-clockwise simultaneously and lowers the plate 605 to sever the voucher portion of the slip.

Cooperating with the knife edge 604 is a plate 630 carried by two arms 631 fast on a sleeve 632 surrounding shaft 303. The plate 630 is beveled and is adapted to be pressed against the knife edge 604. Arms 633 rigid with arms 631 are constantly urged in a clockwise direction by springs 634 surrounding studs 635 projecting from the base of the machine. This tends to move the arms 631 in a clockwise direction and thereby presses the plate 630 against the knife edge 604. The voucher receptacle 598 is cut away at 636 to permit the plate 630 to fully cooperate with the knife edge 604. It is clear that as the slip has been previously fed between the knife edge 604 and the plate 630 it will be severed when the plate 605 is lowered. A projection 637 of the plate 630 engages the knife edge 604 in the normal position to prevent the plate 630 from being rocked beneath the plate 605.

As above described, when the plate 605 is lowered the voucher portion of the slip is severed. After the severing is complete the plate 605 is lowered to an additional extent to press the voucher down onto the receiving table and thereby lower the entire table to the extent of one slip. Means is provided for holding the slips on the table. A plurality of spring clips or holders 638 are fastened to the inside wall of the voucher receptacle 598. The inner sides of these clips 638 are beveled and there are openings 639 cut in the side walls of the receptacle to permit them to move backward and forward. When the plate 605 is lowered the edges of the plate contact with the beveled sides of the clips and force them outward through the openings 639. Then when the plate 605 is again raised the slip is on the table 586 and the spring clips snap back to their normal inner positions in order to hold it there.

An interlocking mechanism is provided whereby the machine can not be operated unless the voucher receptacle 598 is either completely in or entirely out of the machine. This mechanism also prevents withdrawal of the receptacle while the machine is in operation. This mechanism consists of a finger piece 640 fast on a sleeve 641 surrounding the shaft 303. Also fast on this sleeve is an arm 642 which is pivotally connected to a link 643 pivoted at 644 to an arm 645 loose on a shaft 646. A spring 658 stretched between a pin on the link 643 and a stud projecting from the frame 170 tends constantly to rock the finger piece 640 in a counter-clockwise direction (Fig. 7). Integral with the arm 645 is a yoke 647 which transfers the movement of the arm 645 to a sleeve 648 surrounding shaft 646. Fast on the sleeve 648 is a plate 649 which cooperates with a plunger 650 slidably mounted in an extension of frame 171. The plunger 650 is pivoted to a link 651 (Fig. 4), which at its opposite end has a stud 652 projecting through a slot 653 in a lever 654 pivoted to the machine side frame. On the opposite side of the slot 653 the stud is pivoted to an arm 655, in turn pivoted on a stud 656 on the machine frame. Pivotally connected to an extension of lever 654 is a link 657 which at its other end is pivoted to the lever 62. When the machine is released, as before described, the lever 62 is rocked counter-clockwise (Fig. 4). This movement, through the link 657, rocks lever 654 counter-clockwise. The slot 653 is so formed that when the lever 654 is rocked, as just described, the link 651 and plunger 650 will be moved to the right (Fig. 4). If the voucher receptacle is in either its in or out position the finger piece 640 will be in normal position (Fig. 7) and the plate 649 will not interfere with the movement of the plunger 650. If, however, the voucher receptacle is not completely in its normal position the finger piece will contact with the side wall of the voucher receptacle and will thereby move the plate 649 in front of the plunger 650 and thereby prevent the release of the machine. It can also be clearly seen that after the machine is released for operation and the plunger 650 moved forward it will be impossible for the plate 649 to rotate and therefore impossible for the finger piece 640 to be drawn back to permit the removal of the voucher receptacle.

When no slip is to be printed by the machine a mechanism known as the "on and off" knob when turned to the "off" position (Figs. 4, 7, 8 and 11) cripples the slip feeding and tensioning mechanism. The knob 660 is fast on the front end of a shaft 387 and is knurled to facilitate turning with the fingers. Shaft 387 also carries a segmental member 661 fast thereon which is adapted to cooperate with an extension 662 of a pitman 663 which at one end surrounds the shaft 173 and at the other end is fast to the arm 515 mounted on shaft 461 (Fig. 8). It will be remembered that in order to rock the roller 508 into engagement with roller 510 to feed the slip the lever 518 is rocked counter-clockwise about shaft 461 and through the spring 519 rocks bell crank 514. When no slip is to be printed and the knob 660 is turned to the "off" position the segmental member 661 is moved so that its periphery engages the projection 662 on pitman 663 and will therefore prevent any movement of this member to the right (Fig. 8). As this pitman 663 is connected to the arm 515 of bell crank 514 movement thereof is also prevented and the roller 508 therefore can not be moved. As the roller 508 is not moved into engagement with roller 510 no feeding movement can take place.

*Printer—Ribbon mechanism.*

The means for inking the upper and lower sets of type-wheels is an ink ribbon 665 (Fig. 11), supported by seven sleeves 666 rigid with the plate 667 (Fig. 7) and an ink roll 668 on a sleeve 669. The roll 668 is made of felt or suitable ink receiving material. The sleeves 666 are supported by studs 670 and the sleeve 669 by a stud 671, all on the frame 171. This manner of mounting the ribbon is convenient in that by removing the plate 667 the entire ribbon and ink roll may be easily removed from the machine. Plate 667 has openings therein for the date knobs 226 and for the insertion of the key 312 (Fig. 7).

A tension is maintained on the ink ribbon 665 by a roll 673 on a rod 674 (Fig. 11) supported by parallel arms 675 loose on a stud 676 mounted in the frame 171 and supported at its outer end by the plate 667. The roller 673 is held against the ribbon by gravity.

Secured to the roll 668 is a ratchet 677 (Fig. 13). Loose on the stud 671 is an arm 679 carrying a spring-pressed driving pawl 680 engaging the ratchet 677. Pivoted to the arm 679 is a link 681 having a pin 682 extending into a slot 683 in the previously described lever 289. A spring 684 stretched between a stud on the frame 171 and a pin 685 on the link 681 holds the pin in engagement with a toe 686 of a lever 687 loose on the stud 676, thereby limiting the downward movement of the link 681. As previously described in connection with the consecutive number operating mechanism, the lever 289 is rocked counter-clockwise (Fig. 13) and then clockwise to normal position. Near the end of the counter-clockwise movement of said lever 289 pin 682 engages the end of the slot 683 and moves the link 681 upward, thereby rocking the arm 679 counter-clockwise, whereupon the pawl 680 turns the ratchet 667 and consequently the ink roll 668 counter-clockwise to feed the ribbon so that two impressions are not made in the same place on the ribbon. As the lever 289 is moved clockwise to normal position the spring 684 lowers the link and returns the arm 679 and pawl 680 to the position shown in Fig. 13. To prevent a clockwise or retrograde movement of the ratchet 677 a spring-pressed retaining pawl 688 is always in engagement with the ratchet.

The ribbon 665 has a seam 689 straight across said ribbon and as an impression of the type through said seam is not clear, mechanism is provided for feeding the ribbon a greater distance as the seam approaches the platens 371 and 466 so that said seam is always moved past these platens and never stops at the printing line.

Secured to the ribbon 665 there are metal buttons 690 cooperating with a flange 700 of an arm 701 rigid with the lever 687. When one of the buttons 690 engages the flange 700 during the movement of the ribbon it rocks the arm 701 and the lever 687 clockwise and disengages the toe 686 from the pin 685 on the link 681 thereby allowing the spring 684 to move the link 681 downward, whereby the pin 682 is moved close to the lower end of the slot 683. Downward movement of the link 681 also rocks the arm 679 clockwise a greater distance than previously described.

With the parts in the position just mentioned the lower end of the slot 683 engages the pin 682 during the first part of the counter-clockwise movement of the lever 289 and moves the link 681 upward, whereupon the arm 679 is rocked counter-clockwise. As this movement of the link 681 and arm 679 is much greater than that previously described it is very clear that the ribbon is fed a greater distance than when the button carried by the ribbon does not rock the lever 689 to disengage its toe from the pin 685. During this movement of the ribbon the button which caused the long feed is moved past the flange on the arm 679 so that the lever 689 by its own weight is rocked counter-clockwise after the pin 685 has been moved to its highest position and when the lever 289 is rocked clockwise to its normal position the spring 684 pulls the link 681 downward until the pin 685 again engages the toe 686 from the lever 687. These buttons are so positioned on the ribbon that the seam 689 is always fed past the upper and lower sets of type wheels to prevent the platens 371 and 466 from contacting with said seam.

Total and sub-total mechanism.

As the mechanism for taking a total and sub-total in the present machine forms no part of the invention, and as it is substantially the same as the mechanism for that purpose shown and described in the co-pending application of the present applicant, No. 451,508, no description or illustration thereof in contained herein.

Operation.

A very brief description of an operation in which a voucher slip is used will now be given. For the purposes of the present system if a bill is paid within the discount period allowed it is considered a "cash" transaction. Therefore, let it be supposed that the customer whose name appears on the sample bill shown in Fig. 5 has paid his bill. Clerk M, who receives the money, depresses the ledger number keys representing the customer's account number, which is "8602", the proper department key, "3X", the "Cash" key, the amount of $4.95, and his initial key "M". Depression of the M key releases the shaft 63 (Fig. 2), whereby the motor locking lever is released to allow the motor to operate and rotate shaft 81 one clockwise rotation.

The differential mechanism is positioned under the control of the amount keys (Fig. 1), after which the totalizer is rocked into engagement with the differential segment 127 so that when the differential mechanism is returned to normal the amount thereon will be accumulated on the totalizer. The type-wheels 226 are set under control of the racks 180 and the zero elimination mechanism is operated to eliminate the five highest amount racks to prevent the printing of zeros to the left of the amount $4.95. The consecutive number, ledger number, clerk's initial, character of the transaction, number of the department, and the amount of the transaction are all printed upon the detail strip, as illustrated in the first line of printing in Fig. 6. The bill which was rendered to the customer and which has been inserted in the machine receives the above data, and in addition thereto the date. There are two impressions made. The first impression is made on the voucher portion of the bill, which is then fed to the right and the same data again printed on the customer's receipt portion of the bill. On this second impression in addition to the above data the word "Paid" is printed. After the second impression has been made the voucher portion of the slip is severed and the plate carrying the movable knife continues its downward movement, spreading apart the spring clips and forcing the voucher down under them and on to the table in the voucher receptacle. Due to the fact that a slip is printed the zero elimination mechanism for the highest amount rack is rendered ineffective so that the "S" which is in the zero position of the highest amount type-wheel is printed on the detail strip and slip.

During the last part of the rotation of the shaft 81 the totalizer is disengaged from the actuator and all parts of the machine are restored to normal position.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of two sets of printing elements, an impression means cooperating with each of said sets, operating means for each of said impression means, and an additional impression means operated by one of said operating means.

2. In a machine of the class described, the combination of two sets of type-wheels, a hammer cooperating with each of said sets, operating means for said hammers, and an additional hammer operated by said operating means.

3. In a machine of the class described, the combination of two sets of type-wheels, a hammer cooperating with each of said sets, operating means for said hammers, an additional hammer operated by said operating means, and means whereby said additional hammer is disabled.

4. In a machine of the class described, the combination of a plurality of type-wheels adapted to print on an inserted slip, a hammer cooperating with said type-wheels, operating mechanism for said hammer, an additional hammer operated by said operating mechanism, and means for normally disabling said additional hammer.

5. In a machine of the class described, the combination of a plurality of type-wheels adapted to print on an inserted slip, a hammer cooperating with said type-wheels, operating mechanism for said hammer, an additional hammer operated by said operating means, means for normally disabling said additional hammer, and means for rendering said disabling means ineffective.

6. In a machine of the class described, the combination of a plurality of printing elements, impression means cooperating with said printing elements, operating means for said impression means, an additional impression means operated by said operating means, and means for disabling said additional impression means.

7. In a machine of the class described, the combination of a plurality of printing elements, impression means cooperating with said printing elements, operating means for said impression means, an additional impression means operated by said operating means, means for disabling said additional impression means, and means for rendering said disabling means ineffective.

8. In a machine of the class described, the combination of two sets of type-wheels adapted to print on record material, means for feeding said record material, a hammer cooperating with each of said sets, operating means for said hammers, an additional hammer operated by said operating means, means for normally disabling said additional hammer, and means operated by said main operating means for rendering said disabling means ineffective.

9. In a machine of the class described, the combination of a plurality of impression means, a common operating means directly and separately operatively associated with said impression means, and means normally operable to render said operating means ineffective with respect to one of said impression means.

10. In a machine of the class described, the combination of a plurality of impression means, operating means therefor operable a plurality of times during an operation of the machine, and means for rendering said operating means ineffective during one of its operations with respect to one of said impression means.

11. In a machine of the class described, the combination of an impression means, an operating means therefor operable a plurality of times during each operation of the machine, and means normally operative to render said operating means ineffective during one of its operations.

12. In a machine of the class described, the combination of a plurality of impression hammers, a common operating means therefor directly associated with each of said hammers, and means for rendering said operating means ineffective with respect to one of said hammers.

13. In a machine of the class described, the combination of a plurality of impression hammers, a common operating means therefor directly associated with each of said hammers and operable twice during an operation of the machine, and means for rendering said operating means ineffective with respect to one of said hammers during one of its operations.

14. In a machine of the class described, the combination of a plurality of impression hammers pivoted co-axially, and operating means for said hammers pivoted co-axially with respect thereto.

15. In a machine of the class described, the combination of a plurality of pivoted impression hammers, and a common operating means therefor pivoted co-axially with one of said hammers.

16. In a machine of the class described, the combination of a plurality of impression hammers mounted to be operable in the same direction to take impressions, projections on said hammers, and common operating means operatively associated with said projections.

17. In a machine of the class described, the combination of a plurality of means for producing a record on record material, means normally operable for rendering said impression means ineffective, and means adapted to be controlled by record material for preventing operation of said second mentioned means.

18. In a machine of the class described, the combination of a plurality of impression means, spring operated actuating means therefor, and means common to the impression means for rendering said actuating means ineffective.

19. In a machine of the class described, the combination of a plurality of impression hammers, and means for holding said hammers in an inoperative position during an operation of the machine.

20. In a machine of the class described, the combination of a plurality of impression hammers, and means for supporting said hammers in normal inoperative position during an operation of the machine.

21. In a machine of the class described, the combination of type-wheels adapted to print on an inserted slip, a pair of knurled rollers for feeding said slip, said rollers being normally separated from each other, means for normally bringing said rollers into contact with each other for feeding purposes, and means for preventing the contact of said rollers.

22. In a machine of the class described, the combination of type-wheels adapted to print on an inserted slip, a pair of knurled rollers for feeding said slip, said rollers being normally separated from each other, means for normally bringing said rollers into contact with each other for feeding purposes, and manually operated means for preventing the contact of said rollers.

23. In a machine of the class described, the combination of an impression means, actuating means for said impression means operable a plurality of times during each operation of the machine, means for rendering said actuating means ineffective during one operation thereof, and means for rendering said actuating means ineffective during a plurality of operations thereof at a single operation of the machine.

24. In a machine of the class described, the combination of a plurality of impression means, actuating means for said impression means operating said impression means a plurality of times during each operation of the machine, means operable to render said actuating means ineffective with respect to one of said impression means during one operation thereof, and means for rendering said actuating means ineffective with respect to both impression means during each of its operations at a single operation of the machine.

25. In a machine of the class described, the combination of printing elements adapted to print on record material, means for severing a portion of said record material, a detachable receptacle, means for depositing said severed portions in said receptacle, and means for locking the machine against operation when the said receptacle is not completely in or entirely out of the machine.

26. In a machine of the class described, the combination of printing elements adapted to print on record material, means for severing a portion of said record material, a detachable receptacle for receiving said severed portions, and means for supporting said severed portions within said receptacle.

27. In a machine of the class described, the combination of printing elements adapted to print on record material, means for severing a portion of said record material, a detachable receptacle for receiving said severed portions, means for supporting said severed portions in said receptacle, and means for holding said severed portions on said supporting means.

28. In a machine of the class described, the combination of printing elements adapted to print on record material, means for severing a portion of said record material, a detachable receptacle for receiving said severed portions, means for supporting said severed portions in said receptacle, and means for maintaining said supporting means in any one of a plurality of positions.

29. In a machine of the class described, the combination of printing elements adapted to print on record material, a detachable receptacle, supporting means in said receptacle, and a common means for severing a portion of said record material and depositing said severed portion on said supporting means in said detachable receptacle.

30. In a machine of the class described, the combination of type-wheels adapted to print on an inserted slip, a knife for severing a portion of said slip, a detachable receptacle, and a plate for depositing the severed portion of said inserted slip in said detachable receptacle.

31. In a machine of the class described, the combination of type-wheels adapted to print on an inserted slip, a knife for severing a portion of said inserted slip, a detachable receptacle normally locked in the machine, a plate for depositing the severed portion of said inserted slip in said receptacle, and an arm for unlocking said receptacle.

32. In a machine of the class described, the combination of type-wheels adapted to print on an inserted slip, a knife for severing a portion of said inserted slip, a detachable receptacle, a plate for depositing said severed portions of said inserted slips in said receptacle, and means for locking the machine against operation when the said receptacle is not completely in or entirely out of the machine.

33. In a machine of the class described, the combination of type-wheels adapted to print on an inserted slip, a knife for severing a portion of said inserted slip, a detachable receptacle for receiving said severed portions, and a table for supporting said severed portions in said receptacles.

34. In a machine of the class described, the combination of type-wheels adapted to print on an inserted slip, a knife for severing a portion of said slip, a detachable receptacle for receiving said severed portions, a table for supporting said severed portions in said receptacle, and spring clips for holding said severed portions on said table.

35. In a machine of the class described, the combination of type-wheels adapted to print on an inserted slip, a knife for severing a portion of said slip, a detachable receptacle for receiving said severed portions, a table for supporting said severed portions in said receptacle, two brackets supporting said table and having studs extending through slots in said receptacle, and two bars, drawn toward each other by springs, cooperating with each of said studs whereby said table is maintained in any one of a plurality of positions.

36. In a machine of the class described, the combination of type-wheels adapted to print on an inserted slip, a detachable receptacle, a table in said receptacle, and a plate, one edge of which forms a knife for severing a portion of said inserted slip, for placing said slip in said receptacle.

37. In a machine of the class described, the combination of type-wheels adapted to print on an inserted slip, a detachable receptacle, a table in said receptacle, a plate, one edge of which forms a knife for severing a portion of said inserted slip, for placing said slip in said receptacle, and spring clips for holding said severed portion on said table.

38. In a machine of the class described, the combination of printing elements adapted to print on record material, means for severing a portion of said record material, a detachable receptacle, means for depositing said severed portions in said receptacle, and means for locking said receptacle against withdrawal during the operation of the machine.

39. In a machine of the class described, the combination of type-wheels adapted to print on an inserted slip, a knife for severing a portion of said slip, a slidably mounted receptacle for receiving said severed portions, vertical slots in the front and rear walls of said receptacle, a table within said receptacle, brackets for supporting said table, studs carried by said brackets and projecting through said slots, a plurality of vertically extending bars cooperating with said studs, spring means for drawing said bars against said studs, and a latch for normally preventing the withdrawal of said receptacle.

40. In a machine of the class described, the combination of a main operating mechanism, type-wheels adapted to print on an inserted slip, a knife for severing a portion of said slip, a receptacle for receiving said severed portion, releasing means for said main operating mechanism, and a normally inoperative obstruction adapted to be placed in the path of said releasing means.

41. In a machine of the class described, the combination of a main operating mechanism, type-wheels adapted to print on an inserted slip, a knife for severing a portion of said slip, a receptacle for receiving said severed portion, releasing means for said main operating mechanism, a normally inoperative obstruction adapted to be placed in the path of said releasing means, and means for moving said obstruction to its operative position.

42. In a machine of the class described, the combination of a main operating mechanism, type-wheels adapted to print on an inserted slip, a knife for severing a portion of said slip, a receptacle for receiving said severed portion, releasing means for said main operating mechanism, a normally inoperative obstruction adapted to be placed in the path of said releasing means, and means, controlled by the position of said receptacle, for moving said obstruction to its operative position.

43. In a machine of the class described, the combination of a printing mechanism operable to effect two impressions dissimultaneously on record material during each operation of the machine, means for advancing such record material between the impressions, a receptacle, and means for severing such record material behind the first impression and placing the same in the receptacle.

44. In a machine of the class described, the combination in a printing mechanism of a record material receptacle involving a floating supporting table, means for moving said table for enlarging the receptacle to receive additional record material, and means frictionally engaging said table and cooperable therewith for holding it in moved position.

45. In a machine of the class described, the combination in a printing mechanism of a record material receptacle, a record material supporting member movably mounted within said receptacle, means for moving said member for enlarging the receptacle to receive additional record material, and means carried by said receptacle for holding said member in its moved position.

46. In a printing mechanism for printing on slips, a table upon which slips may be moved after an impression has been made thereon, means for placing slips on said table and for moving the table, and supporting means for said table adapted to frictionally hold the same in a plurality of moved positions.

In testimony whereof I affix my signature.

BERNIS M. SHIPLEY.